US010714261B2

(12) United States Patent
Harada

(10) Patent No.: US 10,714,261 B2
(45) Date of Patent: Jul. 14, 2020

(54) MULTILAYER CERAMIC CAPACITOR

(71) Applicant: Murata Manufacturing Co., Ltd., Nagaokakyo-shi, Kyoto-fu (JP)

(72) Inventor: Toshihiro Harada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/395,292

(22) Filed: Apr. 26, 2019

(65) Prior Publication Data

US 2019/0355518 A1    Nov. 21, 2019

(30) Foreign Application Priority Data

May 16, 2018 (JP) ................... 2018-094776

(51) Int. Cl.
*H01G 4/232* (2006.01)
*H01G 4/30* (2006.01)
*H01G 4/008* (2006.01)
*H01G 4/12* (2006.01)

(52) U.S. Cl.
CPC ............. *H01G 4/2325* (2013.01); *H01G 4/30* (2013.01); *H01G 4/008* (2013.01); *H01G 4/1227* (2013.01); *H01G 4/1236* (2013.01)

(58) Field of Classification Search
None
See application file for complete search history.

(56) References Cited

U.S. PATENT DOCUMENTS

| 2015/0016018 A1 | 1/2015 | Onishi et al. |
| 2016/0268046 A1* | 9/2016 | Nishisaka ............... H01G 4/12 |
| 2017/0018359 A1 | 1/2017 | Kimura et al. |

FOREIGN PATENT DOCUMENTS

| JP | 2015-035581 A | 2/2015 |
| JP | 2017-027987 A | 2/2017 |

* cited by examiner

*Primary Examiner* — Michael P Mcfadden
(74) *Attorney, Agent, or Firm* — Keating & Bennett, LLP

(57) ABSTRACT

A multilayer ceramic capacitor includes a laminate including dielectric layers and internal electrode layers, and first and second external electrodes respectively including first and second base electrode layers. The internal electrode layers, and the first and second base electrode layers are connected through first and second alloy layers that cover first and second end surfaces of the laminate. A predetermined portion of ridges between each of the first and second end surfaces, and each of first and second principal surfaces and first and second side surfaces, among ridges of the laminate, has a curvature radius of about 5.4 μm or more and about 10 μm or less, and the first and second external electrodes extend from the first and second end surfaces to cover the ridges.

20 Claims, 11 Drawing Sheets

FIG. 11

| | CURVATURE RADIUS R [μm] OF THE RIDGE | THICKNESS T [μm] OF THE END SURFACE COVERED PORTION | THICKNESS t [μm] OF THE PRINCIPAL SURFACE COVERED PORTION AND THE SIDE SURFACE COVERED PORTION | EVALUATION RESULTS ON MOISTURE RESISTANCE |
|---|---|---|---|---|
| COMPARATIVE EXAMPLE 1 | 2.8 | 7.9 | 3.6 | POOR |
| COMPARATIVE EXAMPLE 2 | 4.1 | 8.2 | 3.7 | POOR |
| EXAMPLE 1 | 5.4 | 8.4 | 3.8 | GOOD |
| EXAMPLE 2 | 6.0 | 8.4 | 3.8 | GOOD |
| EXAMPLE 3 | 7.3 | 8.4 | 3.8 | GOOD |
| EXAMPLE 4 | 10.0 | 9.7 | 4.1 | GOOD |
| EXAMPLE 5 | 10.0 | 9.6 | 3.8 | GOOD |
| EXAMPLE 6 | 10.0 | 9.2 | 3.7 | GOOD |

MULTILAYER CERAMIC CAPACITOR

CROSS REFERENCE TO RELATED APPLICATIONS

This application claims the benefit of priority to Japanese Patent Application No. 2018-094776 filed on May 16, 2018. The entire contents of this application are hereby incorporated herein by reference.

BACKGROUND OF THE INVENTION

1. Field of the Invention

The present invention relates to a multilayer ceramic capacitor, and more particularly to a multilayer ceramic capacitor having a chip that is significantly reduced in size.

2. Description of the Related Art

In recent years, reductions in the size of multilayer ceramic capacitors have been greatly advancing, and a multilayer ceramic capacitor having an external dimension in the length direction of approximately 0.4 mm and in the width and height directions of approximately 0.2 mm, that is, having a 0402 chip size, has been practically used.

In general, a multilayer ceramic capacitor includes a laminate including internal electrode layers and dielectric layers alternately laminated, and a pair of external electrodes provided on an external surface of the laminate. The laminate includes an inner layer portion that forms electrostatic capacitance, and a margin provided so as to surround the inner layer portion.

Of these, the margin predominantly includes dielectric layers and is provided in order to protect the inner layer portion from an external environment. The protection of the inner layer portion from the external environment includes preventing deterioration of insulation resistance of the inner layer portion principally due to entry of water from outside (i.e., ensuring moisture resistance). In addition, a sufficient increase in thickness of a pair of external electrodes themselves contributes to ensured moisture resistance.

When multilayer ceramic capacitors are further reduced in size, an inner layer portion is also reduced in size along with the reduction in the size of the laminate. Therefore, in the case in which no measure is taken, a large electrostatic capacitance may fail to be ensured.

If the inner layer portion provided inside the laminate is increased in size in order to reduce the size of the laminate while electrostatic capacitance is ensured, the margin is inevitably reduced in thickness, which makes it difficult to ensure the moisture resistance described above. Even if the pair of external electrodes are each reduced in thickness in order to increase the size of the laminate within a limited range, it may be difficult to ensure the moisture resistance described above.

Here, for example, Japanese Patent Application Laid-Open No. 2015-35581 discloses a multilayer ceramic capacitor in which internal electrode layers and dielectric layers are reduced in thickness in the laminating direction. Japanese Patent Application Laid-Open No. 2015-35581 discloses a multilayer ceramic capacitor including alloy layers that include a metal forming internal electrode layers and a metal forming base electrode layers provided at the boundaries between the end surfaces of the laminates in exposed portions of the internal electrode layers and the base electrode layers of the external electrodes. Such a configuration is able to achieve a reduction of an equivalent series resistance (i.e., a reduced ESR), and is also able to ensure moisture resistance to a sufficient extent.

To reduce the size of the multilayer ceramic capacitor, however, merely providing the alloy layers as disclosed in Japanese Patent Application Laid-Open No. 2015-35581 may not necessarily sufficiently ensure moisture resistance. That is, for example, as disclosed in Tables 1 and 2 of Japanese Patent Application Laid-Open No. 2015-35581, there may be some cases of failing to sufficiently ensure moisture resistance in spite of increasing the coverage ratio of the alloy layer as well as providing the alloy layers on the end surfaces of the laminates.

As described above, sufficient moisture resistance may not be ensured by covering the end surfaces of the laminates with the alloy layers. Therefore, to reduce the size of the multilayer ceramic capacitor, further improvement is necessary to improve moisture resistance.

SUMMARY OF THE INVENTION

Preferred embodiments of the present invention provide small-sized multilayer ceramic capacitors capable of ensuring moisture resistance and increasing electrostatic capacitance.

The inventor of preferred embodiments of the present invention has discovered that covering the end surface of the laminate with the alloy layer made of a metal of an internal electrode layer and a metal of an external electrode is able to reduce or prevent entry of water into the inner layer portion through the external electrode in a portion covering the external surfaces located around the end surface of the laminates, but merely providing the alloy layers cannot sufficiently reduce or prevent entry of water into the inner layer portion through the external electrode in a portion covering external surfaces located around the end surfaces of the laminates, and preferred embodiments of the present invention overcome this problem.

A multilayer ceramic capacitor according to a preferred embodiment of the present invention includes a laminate, a first external electrode, and a second external electrode. The laminate includes a plurality of dielectric layers and a plurality of internal electrode layers that are alternately laminated in a height direction, and includes a first principal surface and a second principal surface that are opposite to each other in the height direction, a first side surface and a second side surface that are opposite to each other in a width direction orthogonal or substantially orthogonal to the height direction, and a first end surface and a second end surface that are opposite to each other in a length direction orthogonal or substantially orthogonal to both the height direction and the width direction. The first external electrode covers the first end surface, and the second external electrode covers the second end surface. The plurality of internal electrode layers include a plurality of first internal electrode layers connected to the first external electrode and a plurality of second internal electrode layers connected to the second external electrode. The first external electrode includes a first base electrode layer located on the laminate side and a first plating film provided on the first base electrode layer, and the second external electrode includes a second base electrode layer located on the laminate side and a second plating film provided on the second base electrode layer.

Each of the plurality of first internal electrode layers and the first base electrode layer are connected through a first alloy layer including a metal of each of the plurality of first internal electrode layers and a metal of the first base electrode layer, and each of the plurality of second internal electrode layers and the second base electrode layer are connected through a second alloy layer including a metal of each of the plurality of second internal electrode layers and a metal of the second base electrode layer. The first alloy layer continuously covers the first end surface in a portion exposing the plurality of first internal electrode layers in a direction parallel or substantially parallel to an in-plane direction of the first end surface, and the second alloy layer continuously covers the second end surface in a portion exposing the plurality of second internal electrode layers in a direction parallel or substantially parallel to an in-plane direction of the second end surface.

In a multilayer ceramic capacitor according to a preferred embodiment of the present invention, when a plane parallel or substantially parallel to both the height direction and the length direction and including a center portion of the laminate in the width direction is a first plane, a plane parallel or substantially parallel to both the width direction and the length direction and including a center portion of the laminate in the height direction is a second plane, a ridge of the laminate in a portion connecting between the first end surface and the first principal surface is a first ridge, a ridge of the laminate in a portion connecting between the first end surface and the second principal surface is a second ridge, a ridge of the laminate in a portion connecting between the first end surface and the first side surface is a third ridge, a ridge of the laminate in a portion connecting between the first end surface and the second side surface is a fourth ridge, a ridge of the laminate in a portion connecting between the second end surface and the first principal surface is a fifth ridge, a ridge of the laminate in a portion connecting between the second end surface and the second principal surface is a sixth ridge, a ridge of the laminate in a portion connecting between the second end surface and the first side surface is a seventh ridge; and a ridge of the laminate in a portion connecting between the second end surface and the second side surface is an eighth ridge, a curvature radius R1 of the first ridge on the first plane, a curvature radius R2 of the second ridge on the first plane, a curvature radius R3 of the third ridge on the second plane, and a curvature radius R4 of the fourth ridge on the second plane are all in a range of about 5.4 μm or more and about 10 μm or less, and a curvature radius R5 of the fifth ridge on the first plane, a curvature radius R6 of the sixth ridge on the first plane, a curvature radius R7 of the seventh ridge on the second plane, and a curvature radius R8 of the eighth ridge on the second plane are all in a range of about 5.4 μm or more and 10 μm or less.

In a multilayer ceramic capacitor according to a preferred embodiment of the present invention, the first external electrode extends from the first end surface to portions of the first principal surface, the second principal surface, the first side surface, and the second side surface toward the first end surface so as to cover the first ridge, the second ridge, the third ridge, and the fourth ridge, and the second external electrode extends from the second end surface to portions of the first principal surface, the second principal surface, the first side surface, and the second side surface toward the second end surface so as to cover the fifth ridge, the sixth ridge, the seventh ridge, and the eighth ridge.

In a multilayer ceramic capacitor according to a preferred embodiment of the present invention, it is preferable that a maximum distance T1 between an external surface of the first base electrode layer and the first end surface along the length direction on the first plane is about 8.4 μm or more and about 12 μm or less, and that a maximum distance T2 between an external surface of the second base electrode layer and the second end surface along the length direction on the first plane is about 8.4 μm or more and about 12 μm or less.

In a multilayer ceramic capacitor according to a preferred embodiment of the present invention, it is preferable that a maximum distance t1 between an external surface of the first base electrode layer and the first principal surface along the height direction on the first plane, a maximum distance t2 between an external surface of the first base electrode layer and the second principal surface along the height direction on the first plane, a maximum distance t3 between an external surface of the first base electrode layer and the first side surface along the width direction on the second plane, and a maximum distance t4 between an external surface of the first base electrode layer and the second side surface along the width direction on the second plane are all about 3.7 μm or more and about 4.5 μm or less, and a maximum distance t5 between an external surface of the second base electrode layer and the first principal surface along the height direction on the first plane, a maximum distance t6 between an external surface of the second base electrode layer and the second principal surface along the height direction on the first plane, a maximum distance t7 between an external surface of the second base electrode layer and the first side surface along the width direction on the second plane, and a maximum distance t8 between an external surface of the second base electrode layer and the second side surface along the width direction on the second plane are all about 3.7 μm or more and about 4.5 μm or less.

In the multilayer ceramic capacitor according to a preferred embodiment of the present invention, each of the plurality of first internal electrode layers may include a first opposed portion facing the plurality of second internal electrode layers in the height direction; and each of the plurality of second internal electrode layers may include a second opposed portion facing the plurality of first internal electrode layers in the height direction. In this case, the laminate includes an inner layer portion generating electrostatic capacitance by laminating the first opposed portions and the second opposed portions in the height direction. Further, in this case, it is preferable that a thickness d of the dielectric layer on the first plane in a portion included in the inner layer portion satisfies a condition of about 0.4 μm or more and about 0.7 μm or less.

In a multilayer ceramic capacitor according to a preferred embodiment of the present invention, it is preferable that both of the first base electrode layer and the second base electrode layer are made of a sintered metal layer obtained by applying a conductive paste to the layer by a dipping method, followed by baking.

In a multilayer ceramic capacitor according to a preferred embodiment of the present invention, both of a metal from which the first base electrode layer is made and a metal from which the second base electrode layer is made may be Cu.

In a multilayer ceramic capacitor according to a preferred embodiment of the present invention, it is preferable that a content of Cu in the first base electrode layer is about 65 wt % or more, and a content of Cu in the second base electrode layer is 65 wt % or more.

In a multilayer ceramic capacitor according to a preferred embodiment of the present invention, both of a metal from which the plurality of first internal electrode layers are made and a metal from which the plurality of second internal electrode layers are made may be Ni.

In a multilayer ceramic capacitor according to a preferred embodiment of the present invention, it is preferable that the first plating film includes a first Ni plating film covering the first base electrode layer and a Sn plating film covering the first Ni plating film, and it is preferable that the second plating film includes a second Ni plating film covering the second base electrode layer and a Sn plating film covering the second Ni plating film.

In a multilayer ceramic capacitor according to a preferred embodiment of the present invention, the chip size may be about 0.2 mm in length×about 0.1 mm in width.

According to preferred embodiments of the present invention, small-sized multilayer ceramic capacitors each capable of ensuring moisture resistance and increasing electrostatic capacitance are able to be obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a table illustrating results of a verification test.

DETAILED DESCRIPTION OF THE PREFERRED EMBODIMENTS

Figure 1:
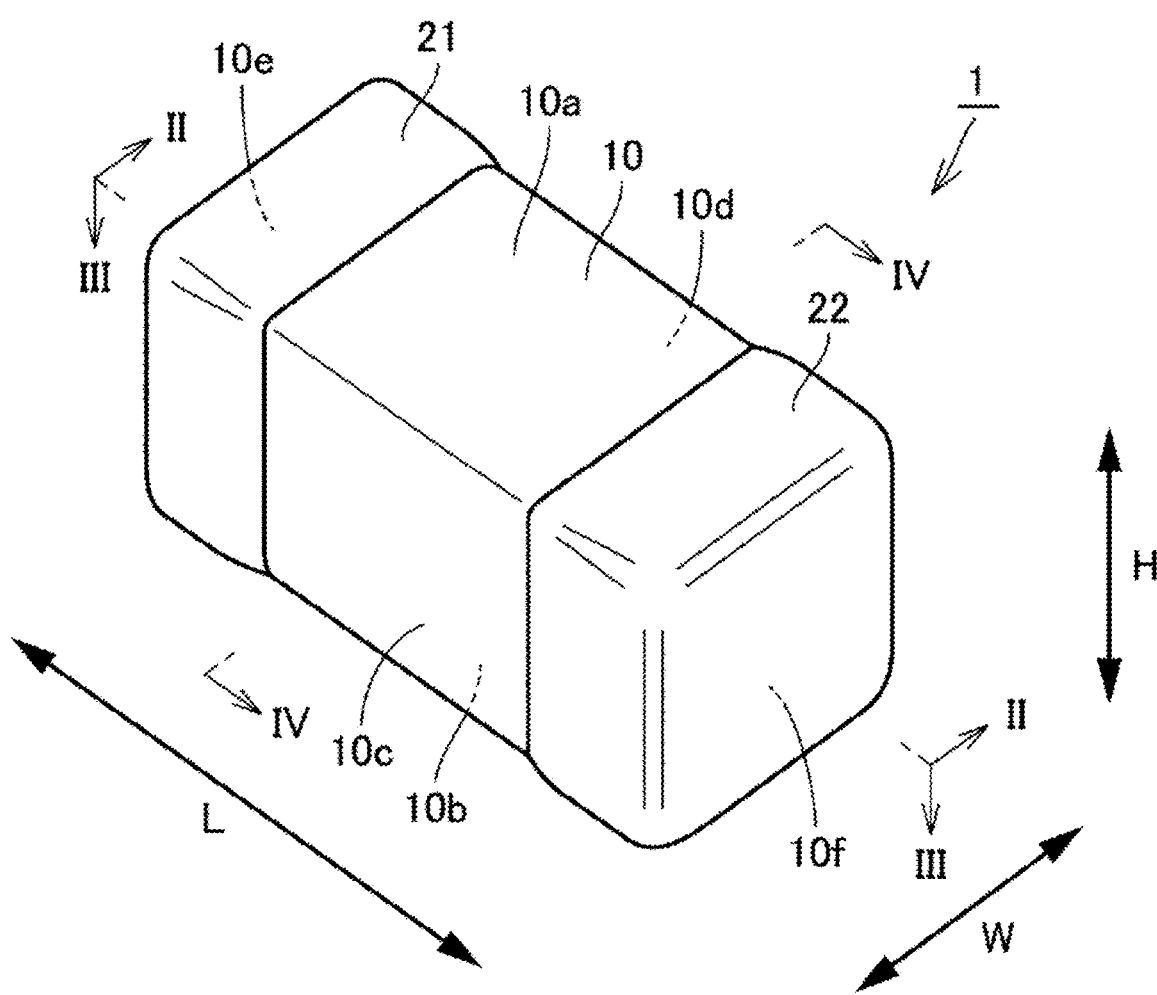
FIG. 1 is a diagrammatic perspective view of a multilayer ceramic capacitor according to a preferred embodiment of the present invention.

Preferred embodiments according to the present invention will be described in detail below with reference to the drawings. In the preferred embodiments described below, the same or common portions are denoted by the same reference numerals in the drawings, and description thereof is not repeated.

Figure 2:
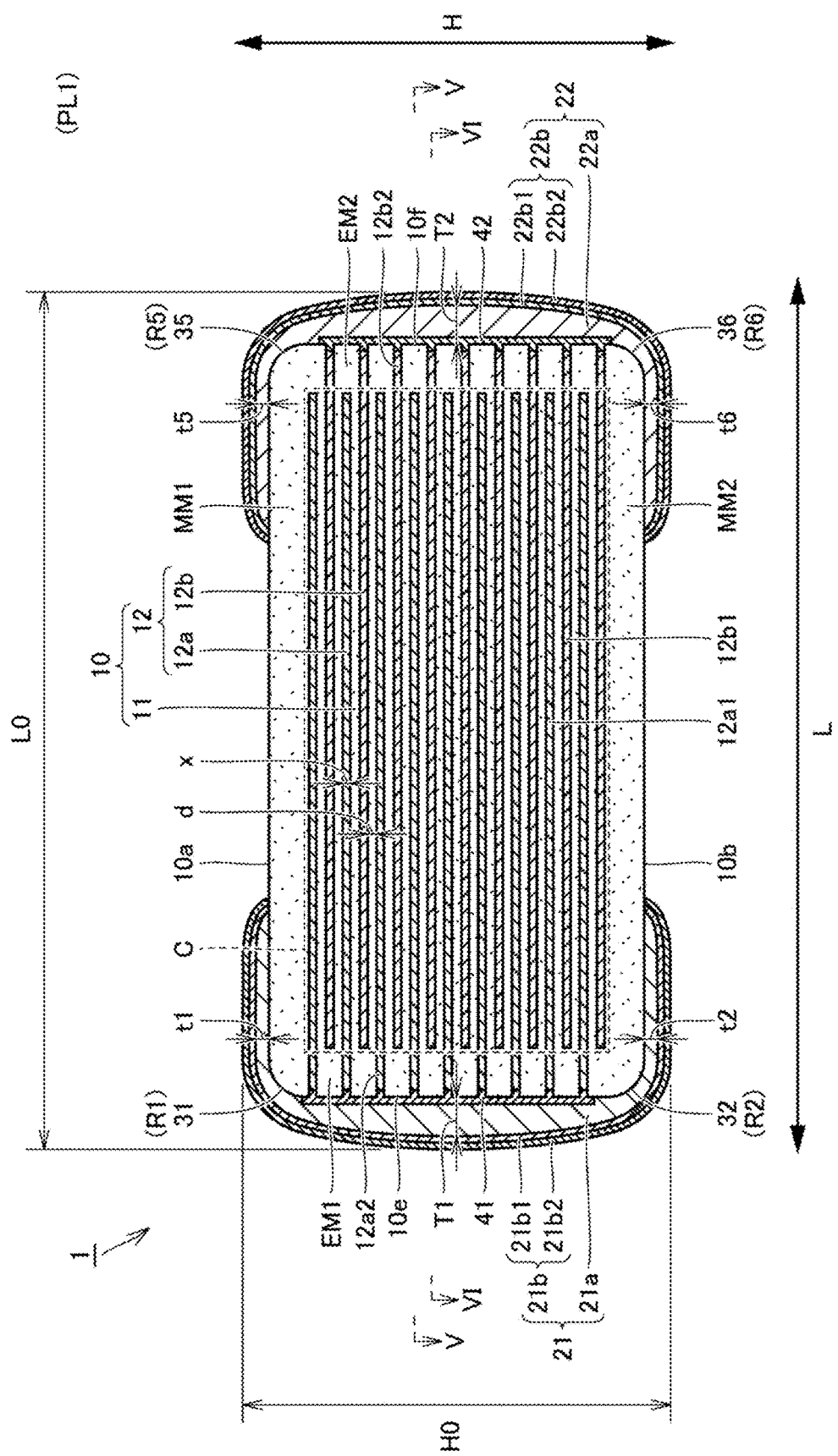
FIG. 2 is a schematic cross-sectional view taken along line II-II shown in FIG. 1.
Figure 3:
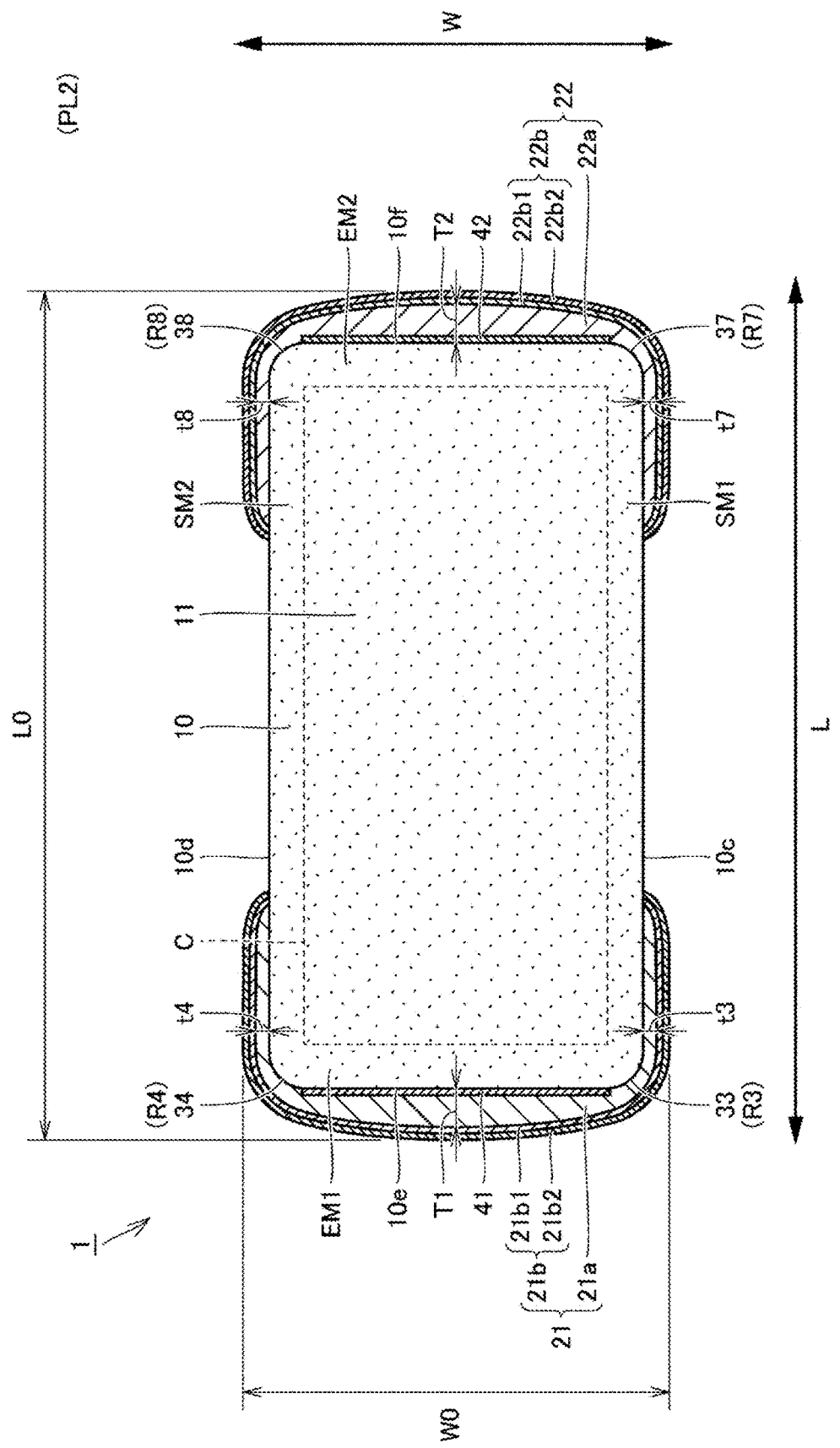
FIG. 3 is a schematic cross-sectional view taken along line III-III shown in FIG. 1.
Figure 4:
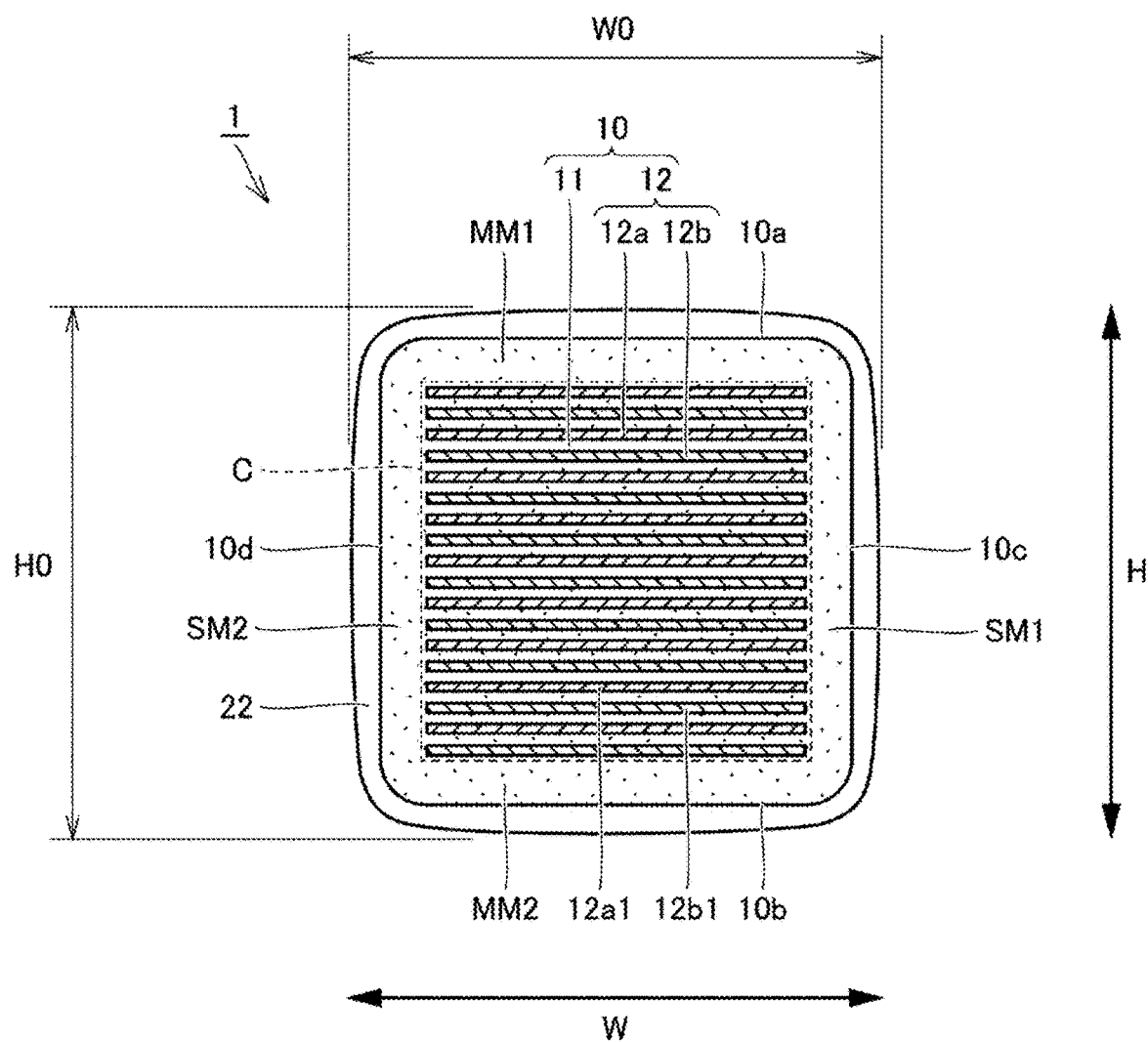
FIG. 4 is a schematic cross-sectional view taken along line IV-IV shown in FIG. 1.
Figure 5:
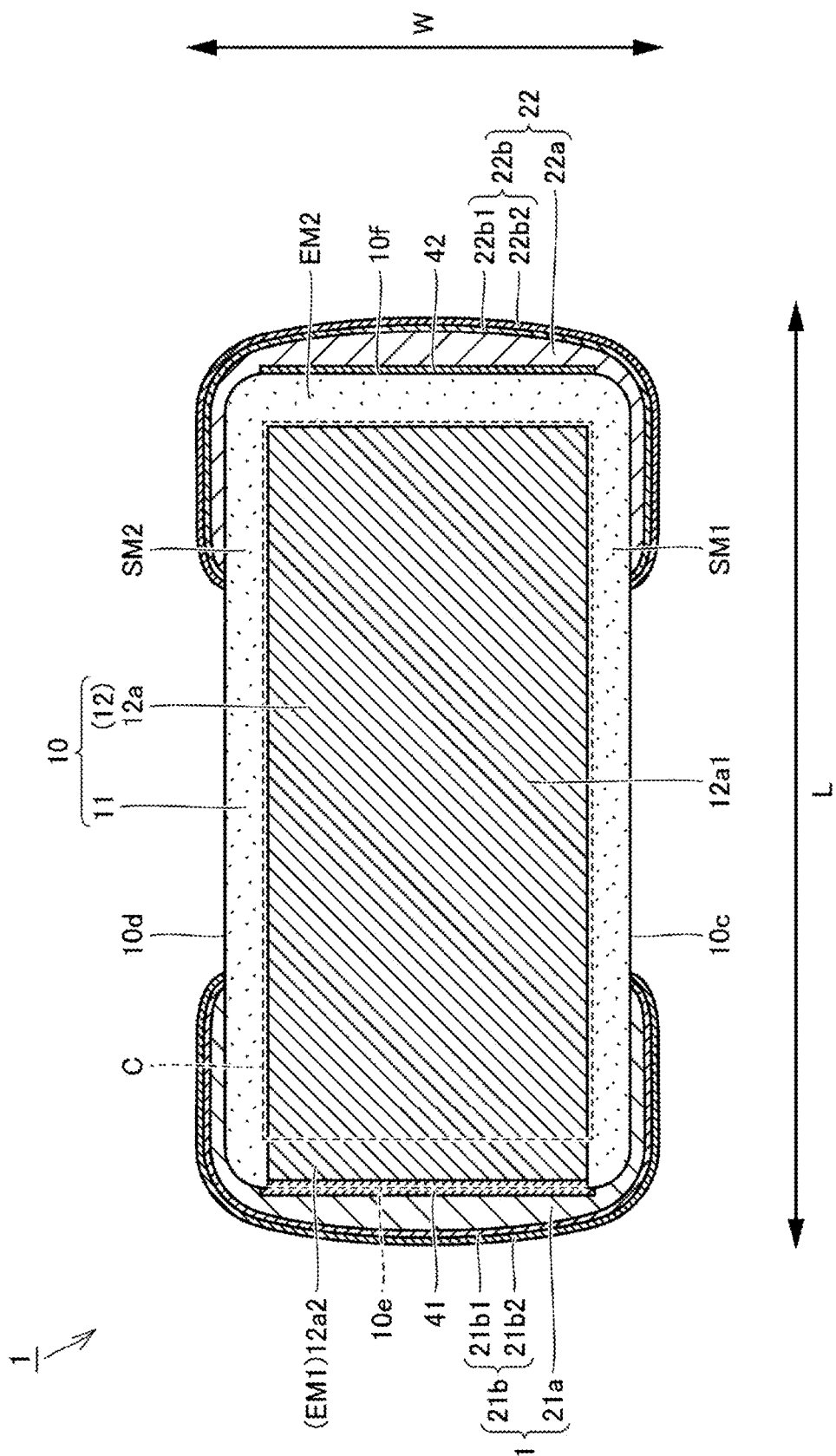
FIG. 5 is a schematic cross-sectional view taken along line V-V shown in FIG. 2.
Figure 6:
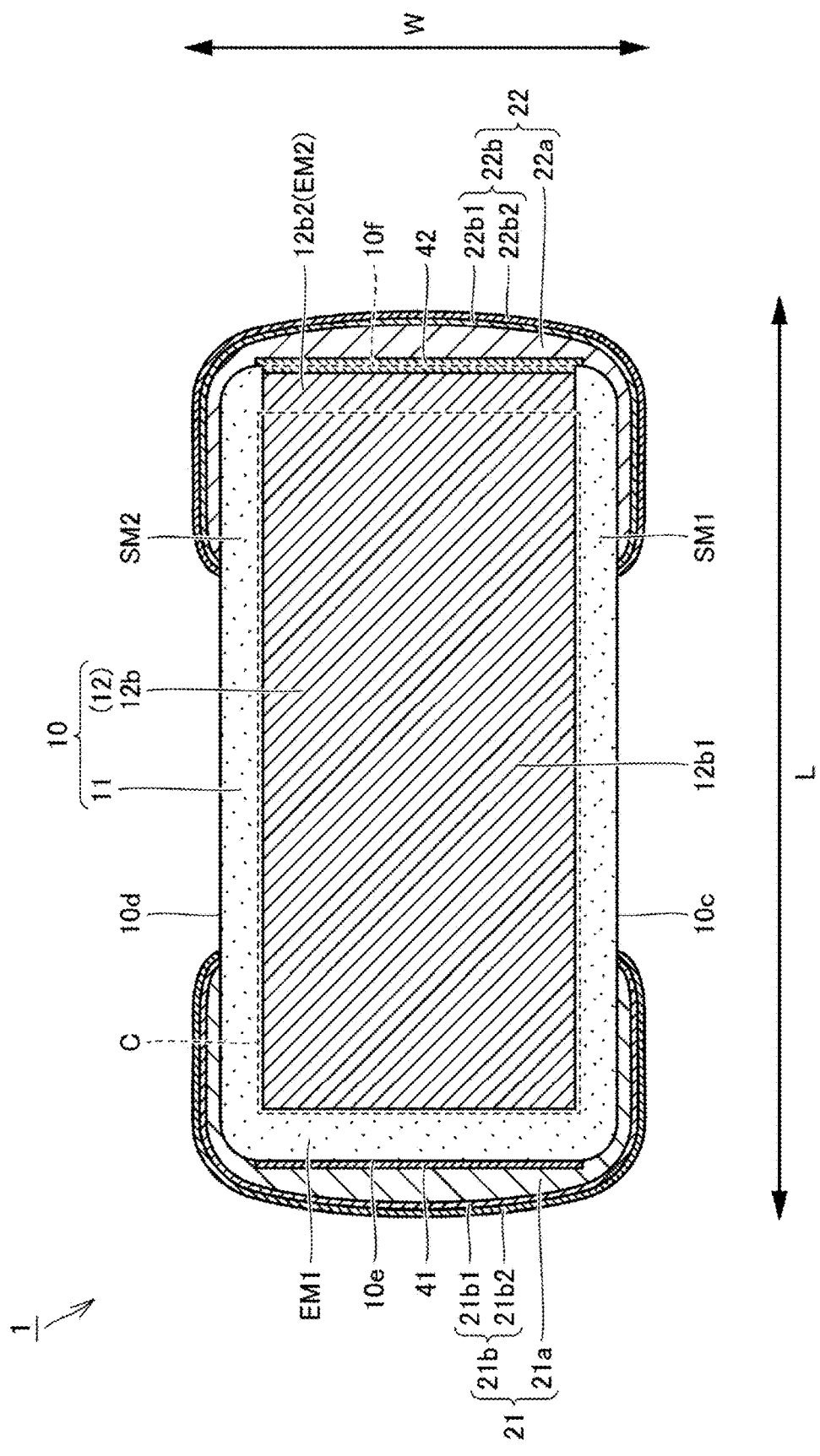
FIG. 6 is a schematic cross-sectional view taken along line VI-VI shown in FIG. 2.
Figure 7:
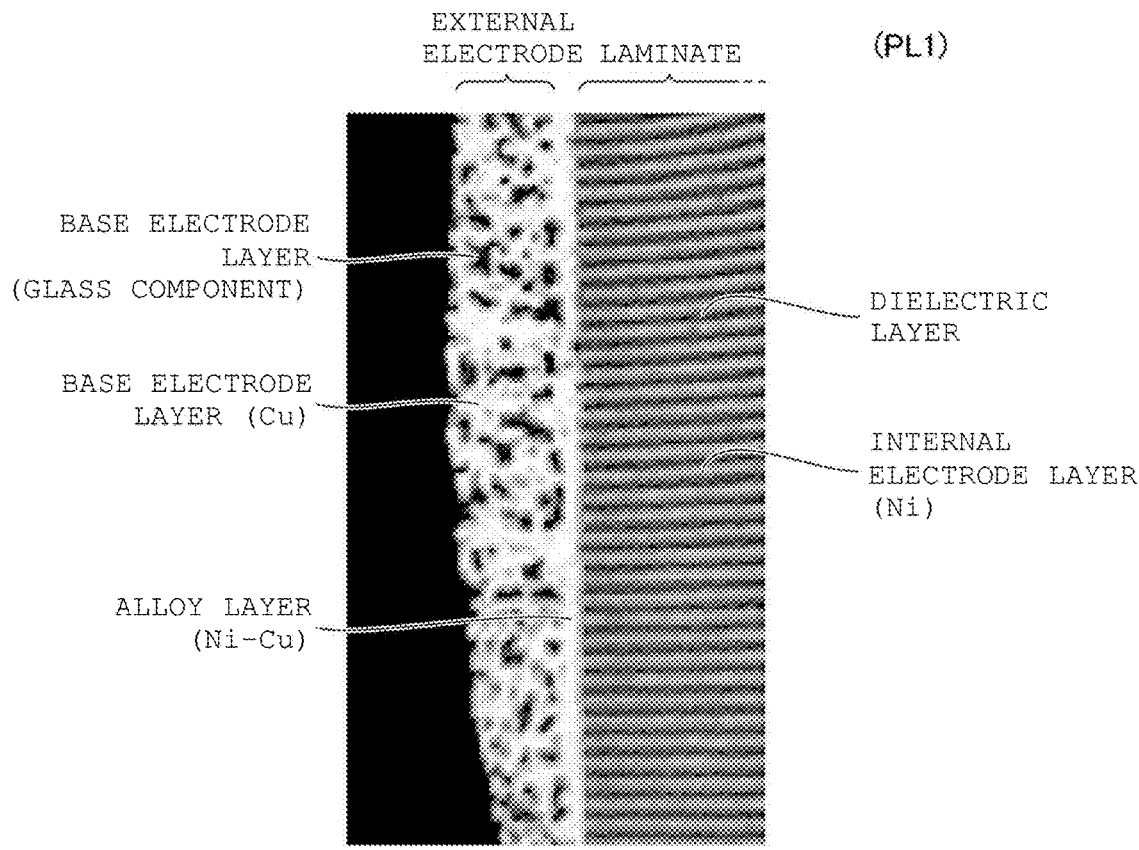
FIG. 7 is an electron micrograph of a cross section of a main portion of the multilayer ceramic capacitor shown in FIG. 1 before a plating film is provided.
Figure 8:
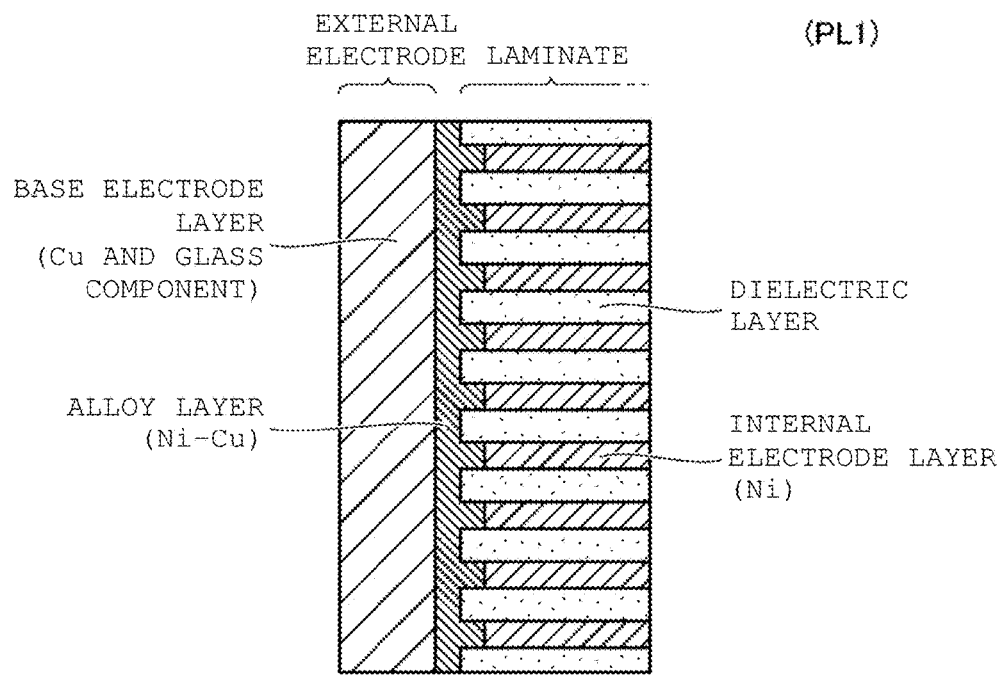
FIG. 8 is a schematic view of the electron micrograph shown in FIG. 7.

Configuration of Multilayer Ceramic Capacitor According to a Preferred Embodiment of the Present Invention FIG. 1 is a diagrammatic perspective view of a multilayer ceramic capacitor according to a preferred embodiment of the present invention. FIGS. 2 to 4 are schematic cross-sectional views taken along lines II-II, III-III, and IV-IV, respectively, shown in FIG. 1. FIGS. 5 and 6 are schematic cross-sectional views taken along respective lines V-V and VI-VI shown in FIG. 2. FIG. 7 is an electron micrograph of a cross section of a main portion of the multilayer ceramic capacitor shown in FIG. 1 before a plating film is provided, and FIG. 8 is a schematic view of the electron micrograph shown in FIG. 7. First, the configuration of a multilayer ceramic capacitor 1 according to the present preferred embodiment of the present invention will be described with reference to these FIGS. 1 to 8. In FIGS. 1 to 6, a length direction, a width direction, and a height direction of the laminate 10 to be described later are designated by arrows L, W, and H, respectively.

As shown in FIGS. 1 to 6, the multilayer ceramic capacitor 1 preferably has an elongated, rectangular or substantially rectangular parallelepiped shape, for example, and includes a laminate 10, a first external electrode 21, and a second external electrode 22.

The laminate 10 preferably has an elongated, rectangular or substantially rectangular parallelepiped shape, for example, and includes a first principal surface 10a and a second principal surface 10b that are opposite to each other in the height direction H, a first side surface 10c and a second side surface 10d that are opposite to each other in the width direction W orthogonal or substantially orthogonal to the height direction H, and a first end surface 10e and a second end surface 10f that are opposite to each other in the length direction L orthogonal or substantially orthogonal to both the height direction H and the width direction W.

The first external electrode 21 covers the entire or substantially the entire first end surface 10e of the laminate 10, and portions of the first principal surface 10a, the second principal surface 10b, the first side surface 10c, and the second side surface 10d of the laminate 10 toward the first end surface 10e.

The second external electrode 22 covers the entire or substantially the entire second end surface 10f of the laminate 10, and portions of the first principal surface 10a, the second principal surface 10b, the first side surface 10c, and the second side surface 10d of the laminate 10 toward the second end surface 10f.

As shown in FIGS. 2 to 6, the laminate 10 includes a plurality of dielectric layers 11 and a plurality of internal electrode layers 12 that are alternately laminated one by one. The plurality of dielectric layers 11 and the plurality of internal electrode layers 12 are laminated along the height direction H of the laminate 10. The number of laminated layers of the plurality of dielectric layers 11 and the plurality of internal electrode layers 12 is actually extremely large (approximately from dozens to hundreds of layers), but for drawing purposes, a state in which the number of laminated layers are substantially reduced is shown.

The plurality of internal electrode layers 12 include a plurality of first internal electrode layers 12a connected to the first external electrode 21 and a plurality of second internal electrode layers 12b connected to the second external electrode 22. The plurality of first internal electrode layers 12a and the plurality of second internal electrode layers 12b are alternately disposed along the height direction H.

Each of the plurality of first internal electrode layers 12a includes a first opposed portion 12a1 facing the second internal electrode layer 12b that is adjacent in the height direction H, and a first extended portion 12a2 connecting the first opposed portion 12a1 and the first external electrode 21. The first opposed portion 12a1 preferably has a rectangular or substantially rectangular shape, for example, when viewed along the height direction H, and the first extended portion 12a2 preferably has a rectangular or substantially rectangular shape, for example, of which the dimension in the width direction W is the same or substantially the same as that of the first opposed portion 12a1 when viewed along the height direction H, and of which the dimension in the length direction L is smaller than that of the first opposed portion 12a1. The first opposed portion 12a1 and the first extended portion 12a2 are continuous in the length direction L.

Each of the plurality of second internal electrode layers 12b includes a second opposed portion 12b1 facing the first internal electrode layer 12a that is adjacent in the height direction H, and a second extended portion 12b2 connecting the second opposed portion 12b1 and the second external electrode 22. The second opposed portion 12b1 preferably has a rectangular or substantially rectangular shape, for example, when viewed along the height direction H, and the second extended portion 12b2 preferably has a rectangular or substantially rectangular shape, for example, of which the dimension in the width direction W is the same or substantially the same as that of the second opposed portion 12b1 when viewed along the height direction H, and of which the dimension in the length direction L is smaller than that of the second opposed portion 12b1. The second opposed portion 12b1 and the second extended portion 12b2 are continuous in the length direction L.

The laminate 10 is partitioned into an inner layer portion C, a first main margin MM1, a second main margin MM2, a first side margin SM1, a second side margin SM2, a first end margin EM1, and a second end margin EM2.

The inner layer portion C is defined by the first opposed portion 12a1 that each of the plurality of first internal electrode layers 12a includes, the second opposed portion 12b1 that each of the plurality of second internal electrode layers 12b includes, and the plurality of dielectric layers 11 in portions therebetween, thus generating electrostatic capacitance.

The first main margin MM1 is located on the first principal surface 10a side from the inner layer portion C in the height direction H, and is defined by the dielectric layer 11 located on this portion. The second main margin MM2 is located on the second principal surface 10b side from the inner layer portion C in the height direction H, and is defined by the dielectric layer 11 located on this portion.

The first side margin SM1 is located on the first side surface 10c side from the inner layer portion C in the width direction W, and is defined by the dielectric layer 11 located on this portion. The second side margin SM2 is located on the second side surface 10d side from the inner layer portion C in the width direction W, and is defined by the dielectric layer 11 located on this portion.

The first end margin EM1 is located on the first end surface 10e side from the inner layer portion C in the length direction L, and is defined by the dielectric layer 11 located on this portion and by the first extended portion 12a2 that each of the plurality of the first internal electrode layers 12a includes. The second end margin EM2 is located on the second end surface 10f side from the inner layer portion C in the length direction L, and is defined by the dielectric layer 11 located on this portion and by the second extended portion 12b2 that each of the plurality of the second internal electrode layers 12b includes.

The first extended portion 12a2 extends to the first end surface 10e of the laminate 10 so as to be continuous with the first opposed portion 12a1. Therefore, the first extended portion 12a2 is exposed on the first end surface 10e of the laminate 10. Thus, the first end surface 10e of the laminate 10 preferably has a rectangular or substantially rectangular shaped region, for example, including exposed ends of the dielectric layers 11 and exposed ends of the first extended portions 12a2 alternately disposed in the height direction H when viewed along the length direction L.

The second extended portion 12b2 extends to the second end surface 10f of the laminate 10 so as to be continuous with the second opposed portion 12b1. Therefore, the second extended portion 12b2 is exposed on the second end surface 10f of the laminate 10. Thus, the second end surface 10f of the laminate 10 preferably has a rectangular or substantially rectangular shaped region, for example, including exposed ends of the dielectric layers 11 and exposed ends of the second extended portions 12b2 alternately disposed in the height direction H when viewed along the length direction L.

Referring to FIGS. 2 to 4, the multilayer ceramic capacitor 1 has a maximum external dimension L0 in the length direction L larger than either of a maximum external dimension W0 in the width direction W and a maximum external dimension H0 in the height direction H. In the preferred embodiment of the present invention, the maximum external dimension W0 in the width direction W and the maximum external dimension H0 in the height direction H are preferably equal or substantially equal. It should be noted that the maximum external dimension W0 in the width direction W and the maximum external dimension H0 in the height direction H may be different from each other. The equal or substantially equal maximum external dimension means that the dimensional difference is within a range of about 5%.

The multilayer ceramic capacitor 1 according to the present preferred embodiment of the present invention is preferably a 0201 size chip having its maximum external dimensions L0, W0, and H0 of about 0.25 mm×about 0.125 mm×about 0.125 mm, for example. However, the chip size is not limited thereto, and the maximum external dimensions L0, W0, and H0 may be about 0.4 mm×about 0.2 mm×about 0.2 mm (a 0402 size), about 0.6 mm×about 0.3 mm×about 0.3 mm (a 0603 size), and about 1.0 mm×about 0.5 mm×about 0.5 mm (a 1005 size). Any of the maximum external dimensions L0, W0, and H0 described above may be measured by observing the multilayer ceramic capacitor 1 using an optical microscope or other suitable measurement device.

Corners and ridges of the laminate 10 are preferably rounded. The corner is a portion at which three surfaces of the first principal surface 10a, the second principal surface 10b, the first side surface 10c, the second side surface 10d, the first end surface 10e, and the second end surface 10f of the laminate 10 are joined, and the ridge is a portion at which two of those surfaces are joined.

Here, as shown in FIGS. 2 and 3, a ridge of the laminate 10 in a portion connecting between the first end surface 10e and the first principal surface 10a is referred to as a first ridge 31; a ridge of the laminate 10 in a portion connecting between the first end surface 10e and the second principal surface 10b is referred to as a second ridge 32; a ridge of the laminate 10 in a portion connecting between the first end surface 10e and the first side surface 10c is referred to as a third ridge 33; a ridge of the laminate 10 in a portion connecting between the first end surface 10e and the second side surface 10d is referred to as a fourth ridge 34; a ridge of the laminate 10 in a portion connecting between the second end surface 10f and the first principal surface 10a is referred to as a fifth ridge 35; a ridge of the laminate 10 in a portion connecting between the second end surface 10*f* and the second principal surface 10*b* is referred to as a sixth ridge 36; a ridge of the laminate 10 in a portion connecting between the second end surface 10*f* and the first side surface 10*c* is referred to as a seventh ridge 37; and a ridge of the laminate 10 in a portion connecting between the second end surface 10*f* and the second side surface 10*d* is referred to as an eighth ridge 38.

The dielectric layer 11 is preferably made of, for example, a perovskite compound including Ba or Ti. As the material from which the dielectric layer 11 is made, a dielectric ceramic including any of $BaTiO_3$, $CaTiO_3$, $SrTiO_3$, $CaZrO_3$, and other suitable material as a main component, may preferably be used, for example. A material including, for example, any of these compounds as the main component and at least any of a Mn compound, a Mg compound, a Si compound, a Fe compound, a Cr compound, a Co compound, a Ni compound, an Al compound, a V compound, a rare earth compound, and other suitable compound added as an accessory component may preferably be used for the dielectric layer 11.

As the material from which the internal electrode layer 12 is made, any of Ni, Cu, Ag, Pd, Au, and other suitable material, or an alloy including any of these elements (e.g., an alloy of Ag and Pd, etc.) may preferably be used, for example. The internal electrode layer 12 may include grains made of dielectric material having the same or substantially the same composition system as that of the dielectric ceramic included in the dielectric layer 11. In the present preferred embodiment of the present invention, the metal used for the internal electrode layer 12 is preferably mainly Ni, for example.

The first external electrode 21 includes a first base electrode layer 21*a* located on the laminate 10 side and a first plating film 21*b* provided on the first base electrode layer 21*a*. The first plating film 21*b* preferably includes a Ni plating film 21*b*1 that covers the first base electrode layer 21*a* and a Sn plating film 21*b*2 that covers the Ni plating film 21*b*1, for example.

The first base electrode layer 21*a* is preferably made of, for example, a sintered metal layer obtained by applying a conductive paste to the laminate 10 by a dipping method, followed by baking, and includes a metal and a glass. Examples of the metal that may preferably be used include any of Ni, Cu, Ag, Pd, Au, and other suitable materials, or an alloy including any of these elements (e.g., an alloy of Ag and Pd, etc.), and examples of the glass that may preferably be used include those containing Si and Zn. Among them, the glass is used to ensure bonding properties between a sintering aid contained in the conductive paste and the dielectric ceramic forming the dielectric layer 11. In the preferred embodiment of the present invention, the metal forming the first base electrode layer 21*a* is preferably mainly Cu, for example.

As described above, the first external electrode 21 covers not only the first end surface 10*e* of the laminate 10 but also the portions of the first principal surface 10*a*, the second principal surface 10*b*, the first side surface 10*c*, and the second side surface 10*d* of the laminate 10 toward the first end surface 10*e*. Accordingly, the first base electrode layer 21*a* and the first plating film 21*b* described above also cover the entire or substantially the entire first end surface 10*e* of the laminate 10 and the portions of the first principal surface 10*a*, the second principal surface 10*b*, the first side surface 10*c*, and the second side surface 10*d* of the laminate 10 toward the first end surface 10*e*. Therefore, the first ridge 31, the second ridge 32, the third ridge 33, and the fourth ridge 34 of the laminate 10 are also covered with the first external electrode 21 including the first base electrode layer 21*a* and the first plating film 21*b*.

The second external electrode 22 includes a second base electrode layer 22*a* located on the laminate 10 side and a second plating film 22*b* provided on the second base electrode layer 22*a*. The second plating film 22*b* preferably includes a Ni plating film 22*b*1 that covers the second base electrode layer 22*a* and a Sn plating film 22*b*2 that covers the Ni plating film 22*b*1, for example.

The second base electrode layer 22*a* is preferably made of a sintered metal layer obtained by applying a conductive paste to the laminate 10 by a dipping method, followed by baking, and includes a metal and a glass. Examples of the metal that may be used include any of Ni, Cu, Ag, Pd, Au, and other suitable material, or an alloy including any of these elements (e.g., an alloy of Ag and Pd, etc.), and examples of the glass that may be used include those containing Si and Zn. Among them, the glass is used to ensure bonding properties between a sintering aid contained in the conductive paste and the dielectric ceramic forming the dielectric layer 11. In the present preferred embodiment of the present invention, the metal of the second base electrode layer 22*a* is preferably mainly Cu, for example.

As described above, the second external electrode 22 covers not only the second end surface 10*f* of the laminate 10 but also the portions of the first principal surface 10*a*, the second principal surface 10*b*, the first side surface 10*c*, and the second side surface 10*d* of the laminate 10 toward the second end surface 10*f*. Accordingly, the second base electrode layer 22*a* and the second plating film 22*b* described above also covers the entire or substantially the entire second end surface 10*f* of the laminate 10 and the portions of the first principal surface 10*a*, the second principal surface 10*b*, the first side surface 10*c*, and the second side surface 10*d* of the laminate 10 toward the second end surface 10*f*. Therefore, the fifth ridge 35, the sixth ridge 36, the seventh ridge 37, and the eighth ridge 38 of the laminate 10 are also covered with the second external electrode 22 including the second base electrode layer 22*a* and the second plating film 22*b*.

The Ni plating films 21*b*1, 22*b*1 included in the first plating film 21*b* and the second plating film 22*b*, respectively, protect the first base electrode layer 21*a* and the second base electrode layer 22*a* from erosion due to solder when the multilayer ceramic capacitor 1 is mounted on a wiring board or other substrate. On the other hand, the Sn plating films 21*b*2, 22*b*2 included in the first plating film 21*b* and the second plating film 22*b* improves wettability against solder when the multilayer ceramic capacitor 1 is mounted on a wiring board or other substrate.

As shown in FIGS. 2, 3, 5, and 6, a first alloy layer 41 is provided between the first end surface 10*e* of the laminate 10 and the first base electrode layer 21*a* of the first external electrode 21. The first alloy layer 41 (i.e., a Ni—Cu alloy layer) includes a metal from which the first internal electrode layer 12*a* (i.e., Ni) is made and a metal from which the first base electrode layer 21*a* (i.e., Cu) is made.

The first alloy layer 41 covers the rectangular or substantially rectangular shaped region in which the exposed ends of the dielectric layers 11 and the exposed ends of the first extended portions 12*a*2 in the first end surface 10*e* of the laminate 10 are alternately disposed in the height direction H. Further, the first alloy layer 41 is covered with the first base electrode layer 21*a*, thus being embedded inside the multilayer ceramic capacitor 1.

Here, the first alloy layer 41 continuously covers the region included in the first end surface 10e of the laminate 10 in a direction parallel or substantially parallel to the in-plane direction of the first end surface 10e. Thus, the first alloy layer 41 covers not only the exposed ends of the first extended portions 12a2 but also exposed ends of the dielectric layers 11 located between the exposed ends of the first extended portions 12a2 that are adjacent in the height direction H.

On the other hand, a second alloy layer 42 is provided between the second end surface 10f of the laminate 10 and the second base electrode layer 22a of the second external electrode 22. The second alloy layer 42 (i.e., a Ni—Cu alloy layer) includes a metal from which the second internal electrode layer 12b (i.e., Ni) is made and a metal from which the second base electrode layer 22a (i.e., Cu) is made.

The second alloy layer 42 covers the rectangular or substantially rectangular shaped region in which the exposed ends of the dielectric layers 11 and the exposed ends of the second extended portions 12b2 in the second end surface 10f of the laminate 10 are alternately disposed in the height direction H. Further, the second alloy layer 42 is covered with the second base electrode layer 22a, thus being embedded inside the multilayer ceramic capacitor 1.

Here, the second alloy layer 42 continuously covers the region included in the second end surface 10f of the laminate 10 in a direction parallel or substantially parallel to the in-plane direction of the second end surface 10f. Thus, the second alloy layer 42 covers not only the exposed ends of the second extended portions 12b2 but also exposed ends of the dielectric layers 11 located between the exposed ends of the second extended portions 12b2 that are adjacent in the height direction H.

These first and second alloy layers 41, 42 are formed during baking of the base electrode layer in the course of manufacturing the multilayer ceramic capacitor 1 according to the present preferred embodiment of the present invention to be described later. That is, the first alloy layer 41 includes a mutual diffusion layer, between the first internal electrode layer 12a and the first base electrode layer 21a, formed during baking of the base electrode layer, and the second alloy layer 42 includes a mutual diffusion layer, between the second internal electrode layer 12b and the second base electrode layer 22a, formed during baking of the base electrode layer.

More specifically, the first alloy layer 41 is formed by diffusing a portion of Ni contained in the first internal electrode layer 12a in a portion located on the first end surface 10e side into the first base electrode layer 21a in a portion covering the first end surface 10e, and by diffusing a portion of Cu contained in the first base electrode layer 21a in the portion covering the first end surface 10e into the first internal electrode layer 12a in the portion located on the first end surface 10e side.

The second alloy layer 42 is formed by diffusing a portion of Ni contained in the second internal electrode layer 12b in a portion located on the second end surface 10f side into the second base electrode layer 22a in a portion covering the second end surface 10f, and by diffusing a portion of Cu contained in the second base electrode layer 22a in the portion covering the second end surface 10f into the second internal electrode layer 12b in the portion located on the second end surface 10f side.

The alloy layers (i.e., the first alloy layer 41 and the second alloy layer 42) are located between the laminate and the external electrode in such a structure that is shown in the electron micrograph of FIG. 7. Black regions and white regions in the laminate shown in FIG. 7 represent dielectric layers and internal electrode layers (Ni), respectively. In contrast, black regions and white regions in the external electrode shown in FIG. 7 represent base electrode layers (glass components) and internal electrode layers (Cu), respectively.

The alloy layer continuously extends in a film between the laminate and the external electrode. More specifically, as shown in FIG. 8, a portion of the alloy layer continuously extends so as to cover the exposed ends of the dielectric layers, and this portion includes a portion provided by diffusing Ni of the internal electrode layer into Cu of the external electrode. In contrast, the other portion of the alloy layer extends so as to enter the laminate from the end surface thereof, and this portion includes a portion provided by diffusing Cu of the external electrode into Ni of the internal electrode layer.

Thus, by providing the first alloy layer 41 located continuously at a boundary between the first end surface 10e of the laminate 10 and the first external electrode 21 and providing the second alloy layer 42 located continuously at a boundary between the second end surface 10f of the laminate 10 and the second external electrode 22, the first and second alloy layers 41, 42 define and function as protective layers capable of reducing or preventing entry of water into the laminate 10, which in turn improves moisture resistance of the multilayer ceramic capacitor 1.

In addition, the first and second alloy layers 41, 42 also define and function as protective layers capable of reducing or preventing entry of plating liquid into the laminate 10 during plating operation in the course of manufacturing the multilayer ceramic capacitor 1 to be described later. In the case in which entry of the plating liquid into the laminate 10 fails to be sufficiently reduced or prevented, hydrogen ions generated in the plating liquid during plating operation are occluded inside the laminate, which leads to deterioration of insulation resistance. Therefore, the first alloy layer 41 and the second alloy layer 42 are able to improve moisture resistance of the multilayer ceramic capacitor 1.

The first alloy layer 41 reduces or prevents entry of water and plating liquid through the first external electrode 21 in the portion covering the first end surface 10e of the laminate 10, and the second alloy layer 42 reduces or prevents entry of water and plating liquid through the second external electrode 22 in the portion covering the second end surface 10f of the laminate 10.

However, merely covering of the first and second end surfaces 10e, 10f of the laminate 10 with the first and second alloy layers 41, 42 described above, respectively, may not ensure sufficient moisture resistance. This is because providing the first alloy layer 41 is not sufficient to reduce or prevent entry of water and plating liquid into the laminate 10 through the first external electrode 21 in the portion covering the external surface located around the first end surface 10e of the laminate 10, and also because providing the second alloy layer 42 is not sufficient to reduce or prevent entry of water and plating liquid into the laminate 10 through the second external electrode 22 in the portion covering the external surface of the second end surface 10f of the laminate 10.

Therefore, in the multilayer ceramic capacitor 1 according to the present preferred embodiment of the present invention, the first ridge 31, the second ridge 32, the third ridge 33, the fourth ridge 34, the fifth ridge 35, the sixth ridge 36, the seventh ridge 37, and the eighth ridge 38 of the laminate 10 are covered with either of the first external electrode 21 and the second external electrode 22 as described above, and that each of these ridges has a curvature radius larger than the predetermined dimension, thus achieving further improvement of moisture resistance. This will be described hereinbelow in detail.

The cross section of the multilayer ceramic capacitor 1 shown in FIG. 2 is obtained by cutting the multilayer ceramic capacitor 1 along a plane parallel or substantially parallel to both the height direction H and the length direction L of the laminate 10 and including a center portion of the laminate 10 in the width direction W (this plane is hereinafter referred to as a first plane PL1). On the other hand, the cross section of the multilayer ceramic capacitor 1 shown in FIG. 3 is obtained by cutting the multilayer ceramic capacitor 1 along a plane parallel or substantially parallel to both the width direction W and the length direction L of the laminate 10 and including a center portion of the laminate 10 in the height direction H (this plane is hereinafter referred to as a second plane PL2).

Referring to FIGS. 2 and 3, in the case in which the curvature radius of the first ridge 31 on the first plane PL1 is R1, the curvature radius of the second ridge 32 on the first plane PL1 is R2, the curvature radius of the third ridge 33 on the second plane PL2 is R3, and the curvature radius of the fourth ridge 34 on the second plane PL2 is R4, the multilayer ceramic capacitor 1 according to the present preferred embodiment of the present invention preferably satisfies a condition in which all of the curvature radii R1, R2, R3, R4 are, for example, about 5.4 µm or more and about 10 µm or less (hereinafter referred to as a first condition).

In the case in which the curvature radius of the fifth ridge 35 on the first plane PL1 is R5, the curvature radius of the sixth ridge 36 on the first plane PL1 is R6, the curvature radius of the seventh ridge 37 on the second plane PL2 is R7, and the curvature radius of the eighth ridge 38 on the second plane PL2 is R8, the multilayer ceramic capacitor 1 according to the present preferred embodiment of the present invention satisfies a condition in which all of the curvature radii R5, R6, R7, R8 are, for example, about 5.4 µm or more and about 10 µm or less (hereinafter referred to as a second condition).

Any of these curvature radii R1 to R8 of the first to eighth ridges 31 to 38 is able to be easily achieved by adjusting a polishing amount during barrel polishing during manufacturing the multilayer ceramic capacitor 1 to be described later.

When the first and second conditions described above are satisfied, an amount of the conductive paste adhered is able to be properly adjusted during formation of the base electrode layers in the course of manufacturing the multilayer ceramic capacitor 1 to be described later (i.e., formation of the first base electrode layer 21a of the first external electrode 21 and the second base electrode layer 22a of the second external electrode 22) so that the thickness of the first external electrode 21 in the portion covering the first to fourth ridges 31 to 34 and the thickness of the second external electrode 22 in the portion covering the fifth to eighth ridges 35 to 38 are able to be sufficiently increased. This enables entry of water and plating liquid into the laminate 10 through these portions to be effectively reduced or prevented, so that moisture resistance is able to be further improved. These first and second conditions are derived from results of a verification test to be described later.

Referring to FIGS. 2 and 3, in the case in which the maximum distance between the external surface of the first base electrode layer 21a and the first end surface 10e along the length direction L on the first plane PL1 is T1, the maximum distance T1 is preferably, for example, about 8.4 µm or more and about 12 µm or less (hereinafter referred to as a third condition).

In addition, referring to FIGS. 2 and 3, in the case in which the maximum distance between the external surface of the second base electrode layer 22a and the second end surface 10f along the length direction L on the first plane PL1 is T2, the maximum distance T2 is preferably, for example, about 8.4 µm or more and about 12 µm or less (hereinafter referred to as a fourth condition).

These maximum distances T1, T2 are able to be both easily controlled by adjusting the viscosity of the conductive paste to be used, for example, during formation of the base electrode layers in the course of manufacturing the multilayer ceramic capacitor 1 to be described later.

When the third and fourth conditions described above are satisfied, the thickness of the first external electrode 21 in the portion covering the first to fourth ridges 31 to 34 and the thickness of the second external electrode 22 in the portion covering the fifth to eighth ridges 35 to 38 are able to be sufficiently increased, so that the advantageous effect of satisfying the first and second conditions is ensured. The lower limits of these third and fourth conditions are derived from results of the verification test to be described later.

Further, referring to FIGS. 2 and 3, in the case in which the maximum distance between the external surface of the first base electrode layer 21a and the first principal surface 10a along the height direction H on the first plane PL1 is t1, the maximum distance between the external surface of the first base electrode layer 21a and the second principal surface 10b along the height direction H on the first plane PL1 is t2, the maximum distance between the external surface of the first base electrode layer 21a and the first side surface 10c along the width direction W on the second plane PL2 is t3, and the maximum distance between the external surface of the first base electrode layer 21a and the second side surface 10d along the width direction W on the second plane PL2 is t4, all of the maximum distances t1, t2, t3, t4 are preferably, for example, about 3.7 µm or more and about 4.5 µm or less (hereinafter referred to as a fifth condition).

In addition, referring to FIGS. 2 and 3, in the case in which the maximum distance between the external surface of the second base electrode layer 22a and the first principal surface 10a along the height direction H on the first plane PL1 is t5, the maximum distance between the external surface of the second base electrode layer 22a and the second principal surface 10b along the height direction H on the first plane PL1 is t6, the maximum distance between the external surface of the second base electrode layer 22a and the first side surface 10c along the width direction W on the second plane PL2 is t7, and the maximum distance between the external surface of the second base electrode layer 22a and the second side surface 10d along the width direction W on the second plane PL2 is t8, all of the maximum distances t5, t6, t7, t8 are preferably about 3.7 µm or more and about 4.5 µm or less (hereinafter referred to as a sixth condition).

All of these maximum distances t1 to t8 are able to be easily controlled by adjusting the viscosity of the conductive paste used, dipping depth of the laminate in the conductive paste, or other parameters during formation of the base electrode layers in the manufacturing of the multilayer ceramic capacitor 1 to be described later.

When the fifth and sixth conditions described above are satisfied, the thickness of the first external electrode 21 in the portion covering the first to fourth ridges 31 to 34 and the thickness of the second external electrode 22 in the portion covering the fifth to eighth ridges 35 to 38 is able to be sufficiently increased, so that the advantageous effect of satisfying the first and second conditions described above is able to be ensured. The lower limits of these fifth and sixth conditions are derived from results of the verification test to be described later.

Therefore, when the first and second conditions described above are satisfied, and in addition to this, when the third, fourth, fifth, and sixth conditions described above are satisfied, the entry of water and plating liquid into the laminate 10 through the first external electrode 21 in the portion covering the external surface located around the first end surface 10e of the laminate 10 at which the first alloy layer 41 is provided is able to be effectively reduced or prevented, and the entry of water and plating liquid into the laminate 10 through the second external electrode 22 in the portion covering the external surface located around the second end surface 10f of the laminate 10 at which the second alloy layer 42 is provided is able to be effectively reduced or prevented, so that, combined with the advantageous effect of providing the first alloy layer 41 and the second alloy layer 42, the entry of water and plating liquid into the laminate 10 is able to be effectively reduced or prevented.

Therefore, the above-described configuration is provided to sufficiently reduce the thicknesses of the first main margin MM1, the second main margin MM2, the first side margin SM1, the second side margin SM2, the first end margin EM1, and the second end margin EM2 provided in the laminate 10, thus enabling the inner layer portion C that generates electrostatic capacitance to be increased in size.

Thus, the multilayer ceramic capacitor 1 according to the present preferred embodiment of the present invention is able to ensure moisture resistance while reducing the chip size to 0201, and also is able to increase electrostatic capacitance.

Each of the thicknesses of the Ni plating films 21b1, 22b1 included in the first and second external electrodes 21, 22, respectively, is not particularly limited, and is preferably in the range of about 2.0 µm or more and about 3.5 µm or less, for example, in order to increase the size of the laminate 10 within the limited range.

Each of the thicknesses of the Sn plating films 21b2, 22b2 included in the first and second external electrodes 21, 22, respectively, is not particularly limited, and is preferably in the range of about 3.0 µm or more and about 3.5 µm or less, for example, in order to increase the size of the laminate 10 within the limited range.

On the other hand, each of the thicknesses (i.e., dimensions in the height direction H) of the first main margin MM1 and the second main margin MM2 is not particularly limited, and is preferably about 10 µm, for example, in order to further increase the electrostatic capacitance.

Each of the thicknesses (i.e., dimensions in the width direction W) of the first side margin SM1 and the second side margin SM2 is not particularly limited, and is preferably about 15 µm, for example, in order to further increase the electrostatic capacitance.

Further, each of the thicknesses (i.e., dimensions in the length direction L) of the first end margin EM1 and the second end margin EM2 is not particularly limited, and is preferably about 25 µm, for example, in order to further increase the electrostatic capacitance.

Here, referring to FIG. 2, in the case in which the thickness of the dielectric layer 11 on the first plane PL1 in the portion included in the inner layer portion C inside the laminate 10 is d, the thickness d is preferably, for example, about 0.4 µm or more and 0.7 µm or less (hereinafter referred to as a seventh condition).

The thickness d is able to be easily controlled by adjusting thicknesses of ceramic green sheets during formation of the ceramic green sheets in the course of manufacturing the multilayer ceramic capacitor 1 to be described later, and by adjusting the pressure bonding force during pressure-bonding of the ceramic green sheets.

When the seventh condition is satisfied, continuity of the first alloy layer 41 and the second alloy layer 42 provided on the first end surface 10e and the second end surface 10f of the laminate 10, respectively, is able to be improved, so that the coverages of the first end surface 10e and the second end surface 10f with the first alloy layer 41 and the second alloy layer 42, respectively, are able to be improved. This is because the thicknesses of the exposed ends of the dielectric layers 11 to be covered with the first alloy layer 41 and the second alloy layer 42 are reduced in the first end surface 10e and the second end surface 10f, which in turn results in smaller intervals between the first extended portions 12a2 adjacent in the height direction H and smaller intervals between the second extended portions 12b2 adjacent in the height direction H.

Therefore, when the above-described configuration is provided, the entry of water and plating liquid through the first external electrode 21 in the portion covering the first end surface 10e and the entry of water and plating liquid through the second external electrode 22 in the portion covering the second end surface 10f are able to be more reliably reduced or prevented, so that moisture resistance is able to be improved.

Referring to FIG. 2, each of the thicknesses x of the plurality of internal electrode layers 12 is not particularly limited, and is preferably about 0.25 µm or more and about 0.4 µm or less, for example, in order to further increase the electrostatic capacitance.

Each of the content of Cu in the first base electrode layer 21a and the content of Cu in the second base electrode layer 22a is preferably about 65 wt % or more, for example. Such configuration accelerates formation of the first alloy layer 41 and the second alloy layer 42 that are mutual diffusion layers during baking of the base electrode layer described above in the course of manufacturing the multilayer ceramic capacitor 1 to be described later, which makes it possible to improve continuity of the first alloy layer 41 and the second alloy layer 42.

Figure 9:
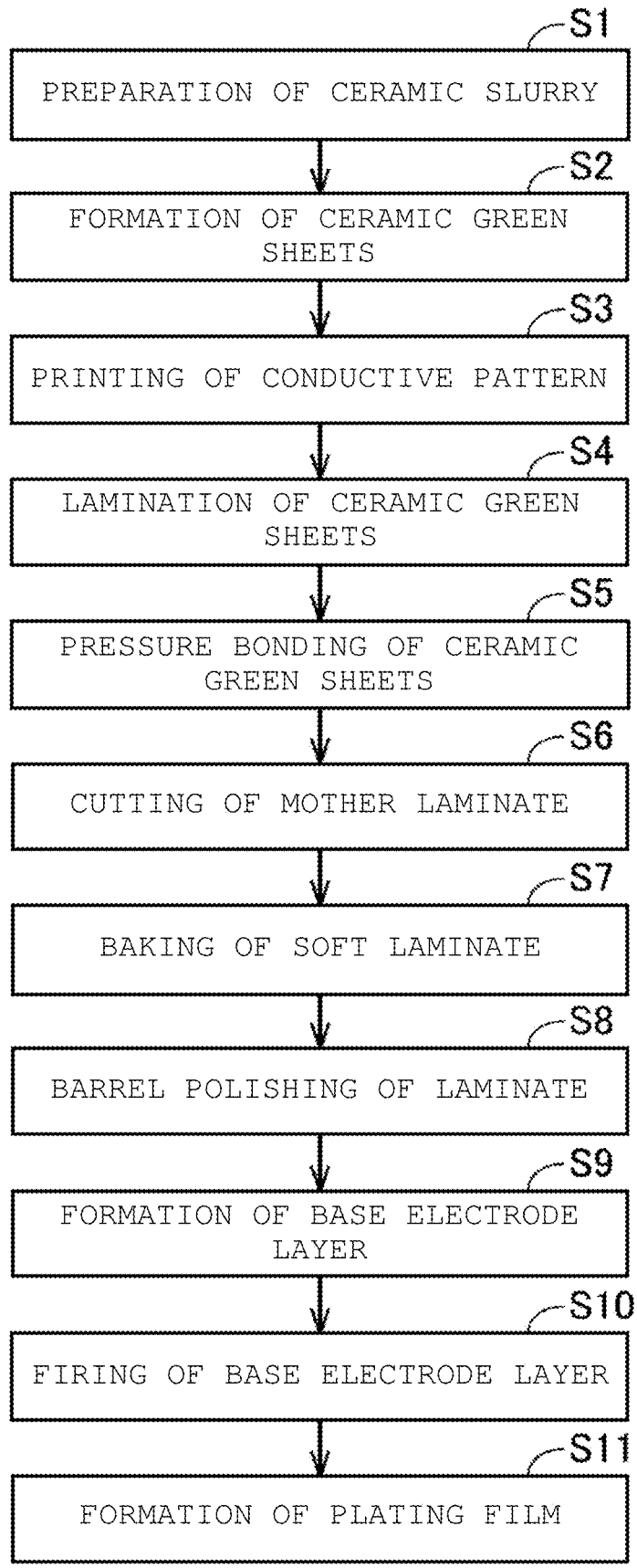
FIG. 9 is a flow diagram illustrating a method for manufacturing the multilayer ceramic capacitor shown in FIG. 1 according to a preferred embodiment of the present invention.
Figure 10:
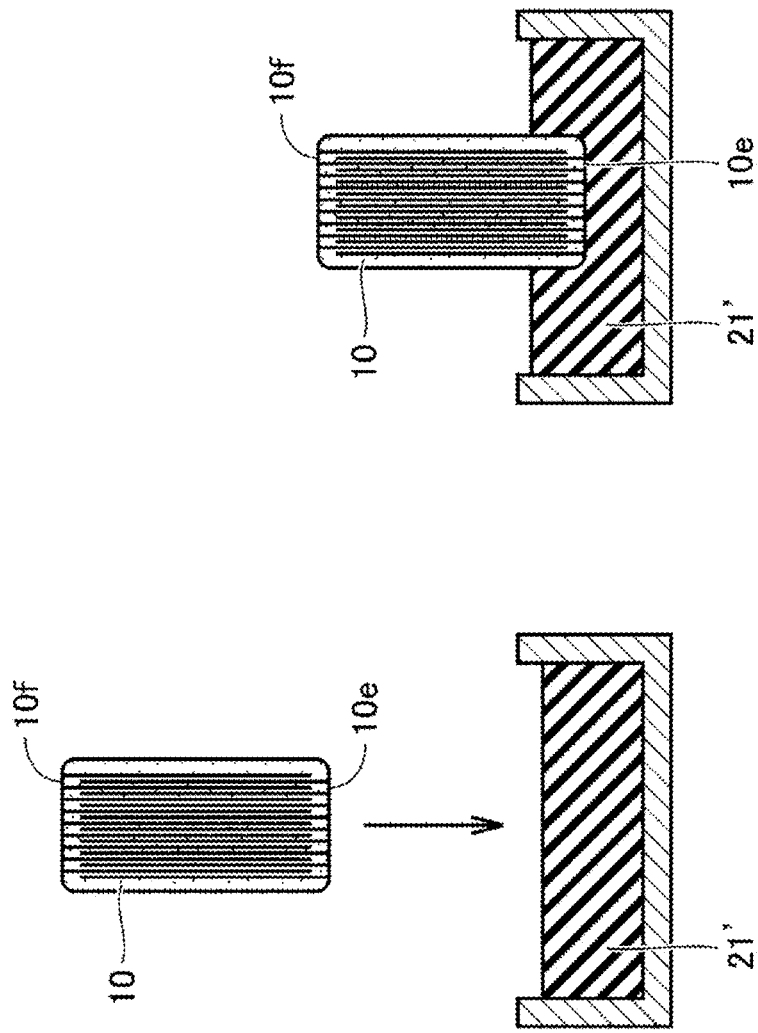
FIGS. 10A to 10C are schematic views illustrating a step of forming a base electrode layer.

Method for Manufacturing Multilayer Ceramic Capacitor According to a Preferred Embodiment of the Present Invention FIG. 9 is a flow diagram illustrating a non-limiting example of a method for manufacturing the multilayer ceramic capacitor according to a preferred embodiment of the present invention, and FIGS. 10A to 10C are schematic views for illustrating in detail a step of forming a base electrode layer in the flow shown in FIG. 9. Next, the non-limiting example of a method for manufacturing the multilayer ceramic capacitor 1 according to a preferred embodiment of the present invention will be described with reference to these FIGS. 9 and 10. The method for manufacturing the multilayer ceramic capacitor 1 shown below is a method for simultaneously mass producing a plurality of multilayer ceramic capacitors, including the steps of collectively performing processing to the halfway stage of the manufacturing process to fabricate a mother laminate, then dividing the mother laminate into individual components, and further processing the resulting soft laminates.

As shown in FIG. 9, when the multilayer ceramic capacitor 1 is manufactured, first, a ceramic slurry is prepared in Step S1. Specifically, a ceramic powder, a binder, a solvent, and the like are mixed at a predetermined mixing ratio to form a ceramic slurry.

Next, in Step S2, ceramic green sheets are formed. Specifically, the ceramic slurry is molded into a sheet on a carrier film using a die coater, a gravure coater, or a micro gravure coater, to form a plurality of ceramic green sheets.

Next, in Step S3, a conductive pattern is printed. Specifically, a conductive paste is printed on a portion of the plurality of ceramic green sheets so as to have a predetermined pattern using a screen printing method or a gravure printing method.

Next, in Step S4, the ceramic green sheets are laminated. Specifically, a predetermined number of ceramic green sheets without a conductive pattern formed are laminated, a plurality of ceramic green sheets with a conductive pattern formed are sequentially laminated thereon, and a predetermined number of ceramic green sheets without a conductive pattern formed are further laminated thereon.

Next, in Step S5, the ceramic green sheets are pressure bonded. Specifically, the laminated ceramic green sheets are pressed along the laminating direction by isostatic pressing or rigid body pressing, and then pressure bonded, to form a mother laminate.

Next, in Step S6, the mother laminate is cut. Specifically, the mother laminate is divided in a matrix by hand push cutting or using a dicing machine, and then separated into a plurality of soft laminates.

Next, in Step S7, the soft laminates are fired. Specifically, the soft laminates thus separated are subjected to heat treatment under predetermined conditions, to fire the soft laminates, so that the laminate 10 is formed. The firing temperature is properly set depending on the kind of the dielectric ceramic or conductive paste used, and is preferably, for example, in the range of about 900° C. or higher and about 1300° C. or lower.

Next, in Step S8, the laminate is subjected to barrel polishing. Specifically, the laminate is sealed in a barrel together with media balls having higher hardness than ceramic material, the barrel is rotated, so that the corner and ridge of the laminate are rounded.

In the barrel polishing, the polishing amount is adjusted so that the curvature radii R1 to R8 of the first to eighth ridges 31 to 38 of the laminate 10 described above satisfy the first and second conditions described above.

Next, in Step S9, a base electrode layer is formed. Specifically, a base electrode layer is formed by a dipping method, for example, in which a portion of the laminate is dipped in the conductive paste including metal powder and glass powder.

More specifically, as shown in FIG. 10A, first, the first end surface 10e of the laminate 10 is disposed so as to face a conductive paste 21', and in this state, the laminate 10 is moved in the direction of the arrow shown in the drawing. Thus, as shown in FIG. 10B, the portion of the laminate 10 toward the first end surface 10e is dipped in the conductive paste 21'. Thereafter, as shown in FIG. 10C, the laminate 10 is moved apart from the conductive paste 21', so that the conductive paste 21' is adhered to the portion of the laminate 10 toward the first end surface 10e.

At this time, the viscosity of the conductive paste 21' and the dipping depth of the laminate 10 in the conductive paste 21' are adjusted, so that the amount of the conductive paste 21' adhered to the portion of the laminate 10 toward the first end surface 10e and the bonded position are improved or optimized. This enables the thickness of the baked base electrode layers to be described later to be optimized for each portion. After the conductive paste 21' is adhered to the portion of the laminate 10 toward the first end surface 10e, the conductive paste 21' is also adhered to the portion of the laminate 10 toward the second end surface 10f in the same or substantially the same manner as described above.

Next, in Step S10, the base electrode layers is baked. Specifically, the laminate including the conductive paste adhered thereto is subjected to heat treatment under the predetermined condition, to bake the conductive paste to the laminate. The baking temperature is properly set depending on the kind of the conductive paste used, and is preferably, for example, in the range of about 600° C. or higher and about 800° C. or lower.

During baking of the base electrode layer, an alloy layer is formed at the boundary between the laminate and the base electrode layer. The alloy layer is formed by diffusing Ni of the internal electrode layer of the laminate into Cu of the base electrode layer, and diffusing Cu of the base electrode layer into Ni of the internal electrode layer of the laminate. Preferably, the temperature for diffusing Ni into Cu is about 400° C. or higher, and the temperature for diffusing Cu into Ni is about 400° C. or higher, for example.

Next, in Step S11, a plating film is formed. Specifically, the laminate including the base electrode layer baked thereon is dipped in a Ni plating bath to form a Ni plating film on the base electrode layer, and thereafter, the Ni plating film is dipped in a Sn plating bath to form a Sn plating film on the Ni plating film.

Through the series of steps described above, a large quantity of multilayer ceramic capacitors 1 according to a preferred embodiment of the present invention are simultaneously manufactured.

<Verification Test>

FIG. 11 is a table illustrating results of a verification test performed with respect to preferred embodiments of the present invention. Referring to such FIG. 11, the verification test performed to derive the first to sixth conditions described above will be described hereinbelow.

In the verification test, the curvature radii of the ridges of the laminate and the thickness of the external electrode were variously changed, and the moisture resistance resulting from such changes was then confirmed. Samples according to Comparative Examples 1, 2 and Examples 1 to 6 have the same or substantially the same configuration except for the curvature radii of the ridges of the laminate and the thickness of the external electrode as described above. Here, the "curvature radius R μm of the ridge" in the table shown in FIG. 11 corresponds to the average value of the curvature radius R1 to R8 described above, the "thickness T μm of the end surface covered portion" in the table shown in FIG. 11 corresponds to the average value of the maximum distances T1, T2 described above, and the "thickness t μm of the principal surface covered portion and the side surface covered portion" corresponds to the average value of the maximum distances t1 to t8 described above.

In addition, the "evaluation results on moisture resistance" in the table shown in FIG. 11 are results obtained by confirming the moisture resistance of the samples based on a PCBT test. More specifically, the samples were mounted on a wiring board using eutectic solder, the wiring board was then poured into a high temperature and high humidity bath at a temperature of about 125° C. and a relative humidity of about 9% RH, as well as put in a state in which a direct current of about 2 V was applied between a pair of external electrodes, and such state was maintained for about 72 hours. Then, a sample whose insulation resistance value was not lowered by double figures or more before and after the test was determined as "good" and a sample whose insulation resistance value was lowered by double figures or more before and after the test was determined as "poor".

As understood from FIG. 11, the curvature radii R1 to R8 were about 2.8 µm and about 4.1 µm in Comparative Examples 1 and 2, respectively, and the evaluation results on moisture resistance were "poor". In contrast to this, the curvature radii R1 to R8 were about 5.4 µm, about 6.0 µm, about 7.3 µm, about 10 µm, about 10 µm, and about 10 µm in Example 1 to 6, respectively, and the evaluation results on moisture resistance were "good".

These results have confirmed that when the first and second conditions such that each of the curvature radii R1 to R8 was in the range of about 5.4 µm or more and about 10 µm or less are satisfied, moisture resistance is ensured.

Here, it has been confirmed that when the maximum distances T1, T2 are about 8.4 µm or more in Examples 1 to 6, and the lower limits of the third and fourth conditions such that the maximum distances T1, T2 are about 8.4 µm or more are satisfied, moisture resistance is ensured. The upper limits of the third and fourth conditions such that the maximum distances T1, T2 are about 12.0 µm or less are required to ensure a sufficient volume of the inner layer portion that generates electrostatic capacitance in order to increase the electrostatic capacitance.

Further, it has been confirmed that when the maximum distances t1 to t8 are about 3.7 µm or more in Examples 1 to 6, and the lower limits of the fifth and sixth conditions such that the maximum distances t1 to t8 are about 3.7 µm or more are satisfied, moisture resistance is ensured. In the case in which the base electrode layer is formed by a dipping method, the maximum distances t1 to t8 are roughly determined depending on the maximum distances T1, T2 as described above. Therefore, the upper limits of the fifth and sixth conditions such that the maximum distances t1 to t8 are about 4.5 µm or less are derived based on the upper limits of the maximum distances T1, T2.

Figure 12:
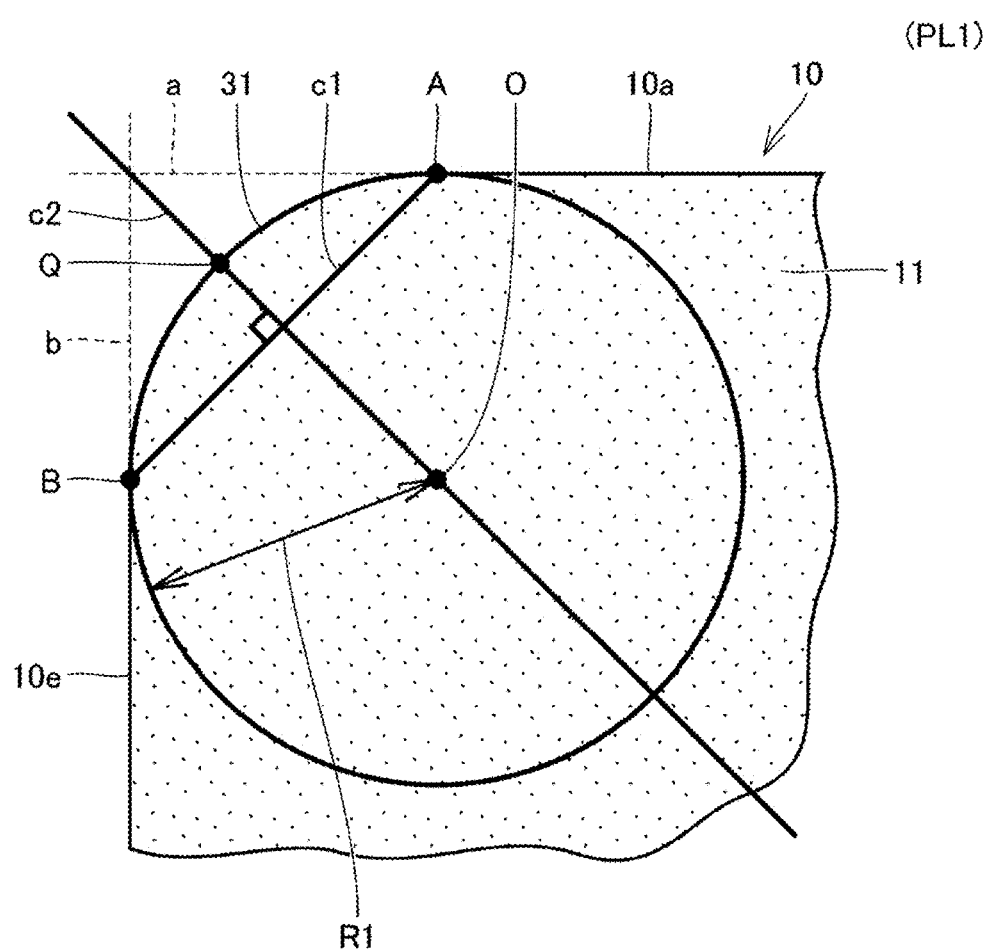
FIG. 12 is a schematic view illustrating a method for measuring a curvature radius R1 of a first ridge of a laminate.

The curvature radii R1 to R8 may be measured by observing portions of the multilayer ceramic capacitor using a microscope. The method for measuring the curvature radii R1 to R8 will be described in detail by illustrating a case in which the curvature radius R1 of the first ridge 31 of the laminate 10 is measured. FIG. 12 is a schematic view illustrating the method for measuring the curvature radius R1.

As shown in FIG. 12, when the curvature radius R1 of the first ridge of the laminate 10 is measured, the first plane PL1 parallel or substantially parallel to both the height direction H and the length direction L of the laminate 10 and including the center portion of the laminate 10 in the width direction W is exposed by polishing the multilayer ceramic capacitor, an enlarged image of the portion including the first ridge 31 is then obtained using a microscope, and the enlarged image thus obtained is manipulated arithmetically.

Specifically, first, a boundary point A between one of two sides adjacent to the first ridge 31 (the one side is defined by the first principal surface 10a of the laminate 10) and the first ridge 31 was identified. Specifically, a straight line a is drawn along the one side, an end point toward the first ridge 31 in the portion where the line a and the outline of the laminate 10 are overlapped is identified, and this end point is determined as the boundary point A.

Next, a boundary point B between the other side, which is different from the above-described side, of the two sides adjacent to the first ridge 31 (the other side is defined by the first end surface 10e of the laminate 10) and the first ridge 31 was identified. Specifically, a straight line b is drawn along the other side, an end point toward the first ridge 31 in the portion where the line b and the outline of the laminate 10 are overlapped is identified, and this end point is determined as the boundary point B.

Next, a line segment c1 is drawn between the boundary point A and the boundary point B, and a perpendicular or substantially perpendicular bisector c2 of the line segment c1 is drawn. A point at which the perpendicular or substantially perpendicular bisector c2 and the first ridge 31 are overlapped is identified as an intersection point Q.

Next, a circle passing through the boundary point A, the boundary point B, and the intersection point Q is drawn, and a distance between a center O of the drawn circle and a circular arc (i.e., the radius of the circle) is measured. This distance is determined as the curvature radius R1 of the first ridge 31.

The curvature radius R2 of the second ridge 32, the curvature radius R5 of the fifth ridge 35, and the curvature radius R6 of the sixth ridge 36 may be measured based on the enlarged image of the first plane PL1 exposed when the curvature radius R1 of the first ridge 31 is measured as described above. On the other hand, for the curvature radius R3 of the third ridge 33, the curvature radius R4 of the fourth ridge 34, the curvature radius R7 of the seventh ridge 37, and the curvature radius R8 of the eighth ridge 38, it is necessary to expose the second plane PL2 parallel or substantially parallel to both the width direction W and the length direction L of the laminate 10 and including the center portion of the laminate 10 in the height direction H, and to obtain an enlarged image of the second plane PL2.

<Method for Measuring the Maximum Distances T1, T2, and t1 to t8>

The maximum distances T1, T2, and t1 to t8 may be measured by observing portions of the multilayer ceramic capacitor using a microscope. The method for measuring the maximum distances T1, T2, and t1 to t8 will be described in detail by illustrating a case in which the maximum distance T1 is measured.

When the maximum distance T1 is measured, the first plane PL1 parallel or substantially parallel to both the height direction H and the length direction L of the laminate 10 and including the center portion of the laminate 10 in the width direction W is exposed by polishing the multilayer ceramic capacitor, an enlarged image of the portion including the first end surface 10e of the laminate 10 and the first external electrode 21 in the portion covering such surface is then obtained using a microscope, and the enlarged image is manipulated arithmetically.

Specifically, the distance between the first end surface 10e along a direction parallel or substantially parallel to the length direction L of the laminate 10 and the external surface of the first base electrode layer 21a is measured stepwise along the height direction H of the laminate 10 at a predetermined interval. Of the plurality of measured distances, the largest value is determined as the maximum distance T1. Here, when the distances are measured stepwise, the interval is determined so that the distances are measured in at least three locations uniformly spaced along the height direction H of the laminate 10.

The maximum distances T2, t2, t5, t6 may be measured based on the enlarged image of the first plane PL1 exposed when the maximum distance T1 is measured as described above. On the other hand, for the maximum distances t3, t4, t7, t8, it is necessary to expose the second plane PL2 parallel or substantially parallel to both the width direction W and the length direction L of the laminate 10 and including the center portion of the laminate 10 in the height direction H, and to obtain an enlarged image of the second plane PL2.

Other Preferred Embodiments

The above-described preferred embodiments of the present invention are described by illustrating the case of a two layer plating film including the Ni plating film and the Sn plating film as the first plating film and the second plating film that cover the first base electrode layer and the second base electrode layer, respectively. However, a one-layered plating film or a three or more layer plating film.

The method for manufacturing the multilayer ceramic capacitor as shown in the preferred embodiment of the present invention is merely illustrative, and the multilayer ceramic capacitor, may be manufactured according to another manufacturing method.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminate including a plurality of dielectric layers and a plurality of internal electrode layers that are alternately laminated in a height direction, and including a first principal surface and a second principal surface that are opposite to each other in the height direction, a first side surface and a second side surface that are opposite to each other in a width direction orthogonal or substantially orthogonal to the height direction, and a first end surface and a second end surface that are opposite to each other in a length direction orthogonal or substantially orthogonal to both the height direction and the width direction;
a first external electrode that covers the first end surface; and
a second external electrode that covers the second end surface; wherein
the plurality of internal electrode layers include a plurality of first internal electrode layers connected to the first external electrode and a plurality of second internal electrode layers connected to the second external electrode;
the first external electrode includes a first base electrode layer on a side of the laminate and a first plating film on the first base electrode layer;
the second external electrode includes a second base electrode layer on a side of the laminate and a second plating film on the second base electrode layer;
each of the plurality of first internal electrode layers and the first base electrode layer are connected through a first alloy layer including a metal from which each of the plurality of first internal electrode layers is made and a metal from which the first base electrode layer is made;
each of the plurality of second internal electrode layers and the second base electrode layer are connected through a second alloy layer including a metal from which each of the plurality of second internal electrode layers is made and a metal from which the second base electrode layer is made;
the first alloy layer continuously covers the first end surface in a portion exposing the plurality of first internal electrode layers in a direction parallel or substantially parallel to an in-plane direction of the first end surface;
the second alloy layer continuously covers the second end surface in a portion exposing the plurality of second internal electrode layers in a direction parallel or substantially parallel to an in-plane direction of the second end surface;
a plane parallel or substantially parallel to both of the height direction and the length direction and including a center portion of the laminate in the width direction is a first plane;
a plane parallel or substantially parallel to both the width direction and the length direction and including a center portion of the laminate in the height direction is a second plane;
a ridge of the laminate in a portion connecting between the first end surface and the first principal surface is a first ridge;
a ridge of the laminate in a portion connecting between the first end surface and the second principal surface is a second ridge;
a ridge of the laminate in a portion connecting between the first end surface and the first side surface is a third ridge;
a ridge of the laminate in a portion connecting between the first end surface and the second side surface is a fourth ridge;
a ridge of the laminate in a portion connecting between the second end surface and the first principal surface is a fifth ridge;
a ridge of the laminate in a portion connecting between the second end surface and the second principal surface is a sixth ridge;
a ridge of the laminate in a portion connecting between the second end surface and the first side surface is a seventh ridge; and
a ridge of the laminate in a portion connecting between the second end surface and the second side surface is an eighth ridge;
a curvature radius R1 of the first ridge on the first plane, a curvature radius R2 of the second ridge on the first plane, a curvature radius R3 of the third ridge on the second plane, and a curvature radius R4 of the fourth ridge on the second plane are all about 5.4 µm or more and about 10 µm or less;
a curvature radius R5 of the fifth ridge on the first plane, a curvature radius R6 of the sixth ridge on the first plane, a curvature radius R7 of the seventh ridge on the second plane, and a curvature radius R8 of the eighth ridge on the second plane are all about 5.4 µm or more and about 10 µm or less;
the first external electrode extends from the first end surface to portions of the first principal surface, the second principal surface, the first side surface, and the second side surface toward the first end surface so as to cover the first ridge, the second ridge, the third ridge, and the fourth ridge; and
the second external electrode extends from the second end surface to portions of the first principal surface, the second principal surface, the first side surface, and the second side surface toward the second end surface so as to cover the fifth ridge, the sixth ridge, the seventh ridge, and the eighth ridge.

2. The multilayer ceramic capacitor according to claim 1, wherein a maximum distance T1 between an external surface of the first base electrode layer and the first end surface along the length direction on the first plane is about 8.4 µm or more and about 12 µm or less; and a maximum distance T2 between an external surface of the second base electrode layer and the second end surface along the length direction on the first plane is about 8.4 µm or more and about 12 µm or less.

3. The multilayer ceramic capacitor according to claim 1, wherein a maximum distance t1 between an external surface of the first base electrode layer and the first principal surface along the height direction on the first plane, a maximum distance t2 between an external surface of the first base electrode layer and the second principal surface along the height direction on the first plane, a maximum distance t3 between an external surface of the first base electrode layer and the first side surface along the width direction on the second plane, and a maximum distance t4 between an external surface of the first base electrode layer and the second side surface along the width direction on the second plane are all about 3.7 µm or more and about 4.5 µm or less; and a maximum distance t5 between an external surface of the second base electrode layer and the first principal surface along the height direction on the first plane, a maximum distance t6 between an external surface of the second base electrode layer and the second principal surface along the height direction on the first plane, a maximum distance t7 between an external surface of the second base electrode layer and the first side surface along the width direction on the second plane, and a maximum distance t8 between an external surface of the second base electrode layer and the second side surface along the width direction on the second plane are all about 3.7 µm or more and about 4.5 µm or less.

4. The multilayer ceramic capacitor according to claim 1, wherein each of the plurality of first internal electrode layers includes a first opposed portion facing the plurality of second internal electrode layers in the height direction;

each of the plurality of second internal electrode layers includes a second opposed portion facing the plurality of first internal electrode layers in the height direction;

the laminate includes an inner layer portion generating electrostatic capacitance including the first opposed portions and the second opposed portions laminated in the height direction; and a thickness d of the dielectric layer on the first plane in a portion included in the inner layer portion is about 0.4 µm or more and about 0.7 µm or less.

5. The multilayer ceramic capacitor according to claim 1, wherein each of the first base electrode layer and the second base electrode layer is made of a sintered metal layer.

6. The multilayer ceramic capacitor according to claim 1, wherein both of a metal from which the first base electrode layer is made and a metal from which the second base electrode layer is made are Cu.

7. The multilayer ceramic capacitor according to claim 6, wherein a content of Cu in the first base electrode layer is about 65 wt % or more; and a content of Cu in the second base electrode layer is about 65 wt % or more.

8. The multilayer ceramic capacitor according to claim 1, wherein both of a metal from which the plurality of first internal electrode layers are made and a metal from which the plurality of second internal electrode layers are made are Ni.

9. The multilayer ceramic capacitor according to claim 1, wherein the first plating film includes a first Ni plating film covering the first base electrode layer and a Sn plating film covering the first Ni plating film; and the second plating film includes a second Ni plating film covering the second base electrode layer and a Sn plating film covering the second Ni plating film.

10. The multilayer ceramic capacitor according to claim 1, wherein a chip size of the multilayer ceramic capacitor is about 0.25 mm in length×about 0.125 mm in width.

11. The multilayer ceramic capacitor according to claim 1, wherein the laminate includes:

an inner layer portion generating electrostatic capacitance;

first and second main margins dispose on either side of the inner layer portion in the height direction;

first and second side margins disposed on either side of the inner layer portion in the width direction; and first and second end margins disposed on either side of the inner layer portion in the length direction.

12. The multilayer ceramic capacitor according to claim 1, wherein a maximum external dimension of the laminate in the length direction is larger than maximum external dimensions of the laminated in both of the height direction and the width direction.

13. The multilayer ceramic capacitor according to claim 1, wherein maximum external dimensions of the laminate in the height direction and the width direction and the equal or substantially equal.

14. The multilayer ceramic capacitor according to claim 1, wherein the plurality of dielectric layers are made of a perovskite compound including Ba or Ti.

15. The multilayer ceramic capacitor according to claim 14, wherein the perovskite compound includes at least one of $BaTiO_3$, $CaTiO_3$, $SrTiO_3$, $CaZrO_3$ as a main component.

16. The multilayer ceramic capacitor according to claim 15, wherein the perovskite compound further includes at least one of a Mn compound, a Mg compound, a Si compound, a Fe compound, a Cr compound, a Co compound, a Ni compound, an Al compound, a V compound, and a rare earth compound as an accessory component.

17. The multilayer ceramic capacitor according to claim 1, wherein the plurality of internal electrode layers are made of at least one of Ni, Cu, Ag, Pd, and Au, an alloy including at least one of Ni, Cu, Ag, Pd, and Au.

18. The multilayer ceramic capacitor according to claim 1, wherein the first and second base electrode layers include metal and glass.

19. The multilayer ceramic capacitor according to claim 18, wherein the metal included in the first and second electrode layers is at least one of Ni, Cu, Ag, Pd, and Au, or an alloy including at least one of Ni, Cu, Ag, Pd, and Au.

20. The multilayer ceramic capacitor according to claim 18, wherein the glass includes at least one of Si and Zn.

* * * * *